(12) United States Patent
Roy

(10) Patent No.: US 6,907,272 B2
(45) Date of Patent: Jun. 14, 2005

(54) ARRAY RECEIVER WITH SUBARRAY SELECTION

(75) Inventor: Sebastien Joseph Armand Roy, Beaumont (CA)

(73) Assignee: Université Laval, Quebec (CA)

( * ) Notice: Subject to any disclaimer, the term of this patent is extended or adjusted under 35 U.S.C. 154(b) by 499 days.

(21) Appl. No.: 10/206,940

(22) Filed: Jul. 30, 2002

(65) Prior Publication Data

US 2004/0198452 A1 Oct. 7, 2004

(51) Int. Cl.[7] ................................................ H04B 1/38
(52) U.S. Cl. ................... 455/562.1; 455/561; 342/373; 342/374
(58) Field of Search .............................. 455/562.1, 560, 455/561, 272–273, 269, 130; 342/373, 374, 375, 368; 343/824

(56) References Cited

U.S. PATENT DOCUMENTS

| | | | |
|---|---|---|---|
| 5,239,541 | A | 8/1993 | Murai |
| 5,515,378 | A | 5/1996 | Roy, III et al. |
| 5,592,490 | A | 1/1997 | Barratt et al. |
| 5,634,199 | A | 5/1997 | Gerlach et al. |
| 5,828,658 | A | 10/1998 | Ottersten et al. |
| 5,990,830 | A * | 11/1999 | Vail et al. .................... 342/368 |
| 6,041,232 | A | 3/2000 | Jennings, III |
| 6,081,566 | A * | 6/2000 | Molnar et al. .............. 375/347 |
| 6,118,773 | A | 9/2000 | Todd |
| 6,173,191 | B1 | 1/2001 | Jennings, III |
| 6,349,219 | B1 * | 2/2002 | Hochwald et al. ....... 455/562.1 |
| 6,438,389 | B1 | 8/2002 | Sandhu et al. |
| 6,529,162 | B2 * | 3/2003 | Newberg et al. ............ 342/375 |
| 6,584,302 | B1 * | 6/2003 | Hottinen et al. ............ 455/69 |
| 6,758,456 | B2 * | 7/2004 | Krieger ........................ 248/530 |
| 6,771,218 | B1 * | 8/2004 | Lalezari et al. ............. 342/373 |
| 2002/0102950 | A1 | 8/2002 | Gore et al. |
| 2002/0164968 | A1 | 11/2002 | Crawford |
| 2002/0175859 | A1 * | 11/2002 | Newberg et al. ............ 342/375 |
| 2004/0053592 | A1 * | 3/2004 | Reial .......................... 455/303 |

FOREIGN PATENT DOCUMENTS

| | | |
|---|---|---|
| EP | 1 172 941 A2 | 9/2001 |
| WO | WO 03/041299 A1 | 5/2003 |

OTHER PUBLICATIONS

Eng, Thomas et al. "Correction to 'Comparison of Diversity Combining Techniques for Rayleigh–Fading Channels'" IEEE, p. 1111, vol. 46, No. 9, Sep. 1998.

Neasmith, Elisabeth A., et al. "New Results on Selection Diversity" IEEE, pp. 695–704, vol. 46, no. 5, May 1998.

Eng, Thomas, et al. "Comparison of Diversity Combining Techniques for Rayleigh–Fading Channels" IEEE, pp. 1117–1129, vol. 44, no. 9, Sep. 1996.

Sayeed, Akbar, et al. "A Canonical Space–Time Characterization of Mobile Wireless Channels" IEEE, pp. 94–96, vol. 3, no. 4, Apr. 1999.

Win, Moe Z., et al. "Analysis of Hybrid Selection/Maximal–Ratio Combining in Rayleigh Fading" IEEE, pp. 1773–1776, vol. 47, no. 12, Dec. 1999.

(Continued)

*Primary Examiner*—Sonny Trinh
(74) *Attorney, Agent, or Firm*—Thomas Adams

(57) ABSTRACT

An array antenna system comprising an array of antenna elements and a receiver which uses a subset of the signals from the antenna elements, the selection of the subset of signals which should be used for a particular user is made on the basis of measurements of potential performance of the receiver with each subset of signals, combined, rather than of each individual signal.

27 Claims, 8 Drawing Sheets

OTHER PUBLICATIONS

Onggosanusi, Eko N. et al., "Canonical Space–Time Processing for Wireless Communications" IEEE, pp. 1669–1680, vol. 48, no. 10, Oct. 2000.

Winters, Jack H. et al., "The Impact of Antenna Diversity on the Capacity of Wirelss Communication Systems" IEEE, pp. 1740–1751, vol. 42, no. 2/3/4, Feb./Mar./Apr. 1994.

Kong, Ning, et al. "SNR of Generalized Diversity Selection Combining with Nonidentical Rayleigh Fading Statistics" IEEE, pp. 1266–1271, vol. 48, no. 8, Aug. 2000.

Proakis, John G. "Digital Communications" Fourth Edition, McGraw Hill, 2001, pp. 148–158.

Gore, Dhanajay A. et al. "Selecting an Optimal Set of Transmit Antennas for a Low Rank Matrix Channel", IEEE, 2000, pp. 2785–2788.

Kong, Ning et al. "Average SNR of a Generalized Diversity Selection Combining Scheme", IEEE Communications Letters, Mar. 1999, 57–59, vol. 3, no. 3.

* cited by examiner

ARRAY RECEIVER WITH SUBARRAY SELECTION

TECHNICAL FIELD

The invention relates to a receiver system comprising an antenna and a receiver, the antenna comprising an array of antenna elements, and to the receiver per se for use therein. The invention is especially, but not exclusively, applicable to array receivers for use in base stations of digital cellular telecommunications networks.

BACKGROUND ART

Mathematical expressions in this patent specification are based upon complex equivalent baseband notation. Essentially, complex quantities are used to represent the amplitude and phase of radio signals with the effect of the carrier removed. Hence, if $s_1(t)$ is the complex baseband equivalent of bandpass modulated signal $s(t)$ and $f_c$ is the carrier frequency, we have:

$$s(t) = Re[s_1(t)e^{j2\pi f_c t}], \tag{1}$$

where $Re[\cdot]$ denotes the real part of its argument and $j=\sqrt{-1}$.

Array antenna radio receivers typically are employed at the base stations of digital cellular communication systems (e.g. mobile telephone networks, broadband wireless access for Internet and/or wide-area networking, etc.) to improve reception link quality (i.e. provide robustness against multipath fading) and/or reduce interference levels where interference can include thermal noise and man-made signals which exist in the desired signal's band. Since such systems typically accommodate large numbers of simultaneously active users in any given cell or cell sector, the base station receiver must be capable of maintaining a plurality of radio links.

Known antenna array radio receiver systems comprise an array of antenna elements coupled to a signal receiving apparatus (also referred to as a radio-frequency (RF) front-end) which in turn is coupled to a signal processing apparatus. The signal receiving apparatus processes the signals from the different antenna elements independently, in separate branches, and performs on each signal standard downconversion, demodulation, filtering to isolate the channel of interest and, possibly, some transformation on the signal to bring it to a form usable by the signal processing apparatus (e.g. analog-to-digital conversion if the signal processor is digital). The signal processor takes the information from all of the branches (i.e. the demodulated, filtered and suitably transformed signal data from each individual antenna element) and, using one of a number of appropriate known techniques, combines and processes it to extract a useful signal y(t), which is the best possible estimate of the desired user signal.

In the context of wireless communications, the received vector x(t) (i.e. the received signal across all array elements) is made up of a desired signal $s_0(t)$ transmitted by a wireless terminal, interfering signals $s_i(t)$ transmitted by competing terminals which operate in the same frequency band or in adjacent bands with some amount of crosstalk being present, and white noise. Hence $$x(t) = c_0(t)s_0(t) + \sum_{i=1}^{M} c_i(t)s_i(t) + n(t) \tag{2}$$

where $c_i(t)$ is an N×1 vector of complex elements describing the channels from the ith terminal to all of the N array elements, M is the number of interfering signals and n(t) is the white noise vector.

In such a context, the function of the antenna array radio receiver is to isolate the desired signal $s_0(t)$ from the interferers and white noise as well as compensate for distortions introduced in the channel $c_0(t)$ (e.g. multipath fading) so that, at all times, the array output y(t) approximates the desired signal $s_0(t)$ as closely as possible.

Typically, the combination of the signals from the individual elements is simply a linear weight-and-sum operation. If an N-element array is considered and x(t) is the N×1 vector of the array element outputs, the array output is defined as $$y(t)=w(t)^H x(t), \tag{3}$$

where w(t) is the N×1 complex weight vector and $(\cdot)^H$ denotes the hermitian transpose (i.e. complex conjugate transpose) of its argument, be it a vector (as it is in the above) or a matrix. Although it is time-varying, the weight vector varies slowly compared to the input and output signals. When a combiner operates according to equation (3), it is termed a linear combiner and the entire receiver is designated a linear array receiver.

Given an N-element linear array, it is theoretically possible to null up to N−1 interferers although at the cost of some degree of noise enhancement. However, arrays can also be employed to provide a diversity gain against multipath fading (since deep fades will rarely occur on more than one branch at a time provided that the antenna elements are spaced sufficiently apart). It is known that a K+M-element array can null up to M−1 interferers while providing a diversity improvement of order K+1 against multipath fading. It is also known that an optimum combiner (described below) implicitly allocates degrees-of-freedom (DOFs) to interference rejection first. Leftover DOFs, if any, are employed to combat fading.

Typically, the receiver collects statistics of the input signal and uses them to derive a weight vector which minimizes some error measure between the array output y(t) and the desired signal $s_0(t)$. The most common error measurement is the mean-square error $$\epsilon = <|y(t)-s_0(t)|^2> = <|w^H(t)x(t)-s_0(t)|^2>, \tag{4}$$

which forms an N-dimensional quadratic surface with respect to the weight vector elements. It thus has a single global minimum. The minimization of this criterion forms the basis of mean-square-error (MSE) minimizing linear array receivers or, equivalently, minimum mean-square-error (MMSE) linear array receivers (also called optimum combiners). (In the following equation (5), and others to follow, the dependence upon t is omitted for the sake of clarity.) Adaptive filtering theory indicates that the best combination of weights for a given sequence of received data is given by $$w = R_{xx}^{-1} c_0, \tag{5}$$

where $R_{xx}$ is the covariance matrix of the received array outputs and is given by $$R_{xx}=<x(t)x^H(t)>, \qquad (6)$$

where (·) denotes the expectation (i.e., the ensemble average) of its argument.

Such array receivers are suitable for use where time dispersion due to multipath propagation does not extend significantly beyond a single symbol period. That is, there is little or no intersymbol interference (ISI).

When the channels carrying useful signals do exhibit significant ISI, the traditional solution is to use an equalizer, which is an adaptive filter whose purpose is to invert the channel impulse response (thus untangling the ISI) so that the overall impulse response at its output will tend to have an ideal, flat (or equalized) frequency spectrum.

The signal processing portion of the standard linear equalizer works in the same way as a linear adaptive array receiver except that the signal sources are not points in space (i.e., the array of antenna elements) but points in time. The signals are tapped at a series of points along a symbol-spaced delay line (termed a tapped delay line or TDL), then weighted and combined.

While the implementation of the signal processing apparatus for both equalizer and array receiver can be identical (minimization of the MSE by adaptive weighting of the inputs) the performance will differ. Because signals are physically sampled at different points in space by the array receiver, it is very effective at nulling unwanted signal sources or co-channel interference (CCI). However, it has limited ability against intersymbol interference (ISI) due to dispersive, i.e., frequency-selective, fading, since the latter is spread in time. On the other hand, the equalizer is adept at combatting ISI but has limited ability against CCI.

In environments where both ISI and CCI are present, array reception and equalization may be combined to form a space-time processor. The most general form of the latter is obtained when each weighting multiplier in a narrowband array is replaced by a full equalizer for a total of N equalizers. Again, the implementation of the signal processing apparatus will be identical and will rely on equation (3) supra. The only difference is that the weight vector w and the input vector x will be longer. Indeed, for an equalizer length of L taps and an array size of N elements, the vectors w and x will both have LN elements.

The canonical linear mean-square-error minimizing space-time receiver (i.e. the most obvious and immediate linear space-time receiver structure and also in certain respects the most complex) comprises an antenna array where each array element output is piped to a finite impulse response (FIR) adaptive filter, which in this context is referred to as an equalizer. Each adaptive filter comprises a tapped-delay line having taps spaced by a symbol period or a fraction of a symbol period. For good performance, the length of the tapped-delay line should be equal or superior to the average channel memory length. In many cases, the number of taps this implies can be very large (e.g. 10–100 per adaptive filter). An important special case is where the channel memory length is of the order of a symbol period. The channel is then said to be flat fading and the adaptive filters in each branch are reduced to a single weighting complex multiplier. This simplified structure is termed a narrowband array or spatial processor.

On the other hand, if the channel memory length is more than a single symbol period, the channel is subjected to frequency-selective fading (also called time dispersive or simply dispersive fading) thus inducing intersymbol interference (ISI) at the receiver. Such a situation requires the more general structure with a complete adaptive filter per branch; such a system is variously designated as wideband array or space-time processor.

The weights multiplying each tap output must be constantly adapted to follow the changes in the characteristics of the desired user's and interferers' channels. In a representative class of such systems, the weights are computed on a block-by-block basis (block adaptation) and each block contains a training sequence of known training symbols for that purpose. In digital wireless communications systems, the block used for adaptation purposes will typically correspond to a data packet as defined by the networking protocol in use.

By adapting the weights to minimize a global performance index, i.e. the mean-square error between the desired signal and the S-T receiver output, the receiver implicitly performs the following:

reduces or eliminates intersymbol interference (ISI) caused by frequency-selective fading in wideband channels;

reduces or eliminates co-channel interference (CCI) from nearest cells where carriers are reused or from inside the cell, since the space-time processor permits reuse of carriers within the cell or the sector thanks to its power of spatial discrimination—often referred to as Space Division Multiple Access (SDMA).

improves output SNR (due to the array's larger effective aperture).

The number of temporal elements depends primarily upon the degree of intersymbol interference and could be between say, 10 and 100. The number of spatial elements depends upon the number of antenna elements and could be, say, 10. The number of antenna elements is chosen as a function of the maximum number of interferers to be nulled and the desired gain against fading.

Since wireless systems are typically interference-limited (i.e., interference is the main impediment which prevents capacity increase—accommodating more active users—above a certain limit), the first two benefits of space-time processors are of most interest in order to increase capacity To achieve maximal benefit, it is better to combine the array with carrier reuse-within-cell (RWC), also called space-division multiple access (SDMA). In known such systems, separate S-T processors will have to be implemented for every user (all processors share the same physical antenna array and front-end receiver circuitry but have distinct equalizers and combiners). This can result in a prohibitively complex receiver system from a numerical and/or hardware complexity standpoint, especially if the memory length L of the channels is large and regardless of whether RWC is used or not. Therefore, it is of great relevance to develop reduced-complexity space-time receiver architectures.

It is known to reduce complexity and/or hardware requirements of an array receiver by using a single RF receiver and selecting different antenna elements in turn. This is termed selection diversity and it provides some gain against multipath fading but, in general, little or no gain against CCI.

It is also known to do so by selecting a subset of the signals from the antenna elements, for each user, and processing those.

In the context of wireless communications, when a remote station transmits a signal to the array antenna, multipath effects will result in destructive/constructive interference, so the signals in each branch, i.e., extracted from the different antenna elements, will have different signal-to-noise ratios. Also, the signal may be strongest in a certain angular sector or cone, depending upon the configuration of the antenna array. Indeed, little scattering occurs in the immediate vicinity of an elevated base station such that most received energy will typically be concentrated in a narrow angle around a single main direction of arrival.

It is known, therefore, to select and process only a subset of the signals comprising those with the highest signal-to-noise ratio, as disclosed, for example, in an article entitled "SNR of Generalized Diversity Selection Combining with Nonidentical Rayleigh Fading Statistics" by N. Kong and L. B. Milstein, IEEE Transactions on Communications, Vol. 48, No. 8, pp. 1266–1271, August 2000. A disadvantage of these techniques is that they base the subset selection upon instantaneous measured power in each branch, which still entails a significant amount of hardware complexity and/or computational overhead. Indeed, while only as many complete RF front-ends as subset elements may be required, all array elements must be monitored at all times, possibly using a plurality of signal power measurement devices. Moreover, a software-radio-type implementation will require the processor to poll the said measurement devices frequently thus introducing undesirable overhead.

A further disadvantage of such known techniques is that they do not differentiate between interference from other users and white noise It is possible that a subset of branch signals with the highest individual signal-to-noise ratios, when combined, will not perform as well as a different subset in which one or more of the branch signals have lower individual signal-to-noise ratios. For example, the latter subset of signals might involve interferers whose signals tend to negate each other so that, when combined, they produce a better overall signal quality.

U.S. Pat. No. 6,081,566 issued Jun. 27, 2000 by Molnar et al. discloses a receiver which bases subset selection upon a number of criteria including signal quality as measured from signal power and so-called "impairment power". This is not entirely satisfactory, however, because the signal quality measurement still is computed for each individual branch and so could still result in a sub-optimum subset being selected.

DISCLOSURE OF INVENTION

An object of the present invention is to at least ameliorate one or more of the problems associated with the above-mentioned known array antenna systems. To this end, in embodiments of the present invention, the selection of the subset of signals which should be used for a particular user is made on the basis of measurements of potential performance of each subset of signals, rather than of each individual signal.

In this specification, the term "user" will be used to denote a remote transmitter whose signals are received by the receiver section.

According to one aspect of the present invention, an array receiver system, for receiving signals from a plurality of transmitting users, comprises an array of antenna elements (22/1, . . . , 22/10) and a receiver having a plurality of receiver sections, each corresponding to a different one of the users, the receiver sections each having a signal processing unit (160) for processing and combining a subset of signals from the antenna elements to produce a received signal for the corresponding user, the receiver further comprising switching means (180) for selecting a plurality of different subsets of signals from the antenna elements for processing for the signal processing unit (160), each subset consisting of a predetermined number of said signals, each signal processing means serving to control the switching means to change the signals comprising the subset of signals used by the corresponding receiver section in dependence upon a measure of the potential performance of that receiver section with different subsets of said plurality of signals, said measure being based upon the combined subset of signals. (SDMA)

Where the array receiver system is to be used in a space-division multiple access (SDMA) communications system, the switching means may comprise a switch matrix in each receiver section, and the receiver comprise a plurality of radio frequency (RF) front-end sections each coupling a respective one of the antenna elements to each of said switching means and each of the signal processing means. Each front-end section would convert the signal from the corresponding antenna element to a format suitable for processing by said processing means, and each of said switch matrices select subsets of the converted signals for application to the associated one of the different receiver sections.

Where the array receiver system is to be used in a non-SDMA system (i.e. where the receiver is concerned with a single desired user per carrier), each receiver section may comprise a plurality of radio frequency (RF) front-end units equal in number to the number of signals in each of said subsets coupled to the signal processing means, and the switching means may comprise a switch matrix for coupling selected ones of the antenna elements to respective ones of the RF front-end sections of each receiver section, each RF front-end section for converting the subset of signals from the corresponding antenna elements to a format suitable for processing by said processing means.

The measurement of the performance of the different subsets may be carried out periodically, preferably making use of samples of known training sequences embedded in the received signal.

It is envisaged that the initial subset selection could be made when the remote station is establishing communications with the receiver, perhaps during the usual identification/authentication procedure. Subsequent changes to the selected subset may be performed using standard continuous (i.e. tracking) algorithms which do not require known training sequences or pilot symbols, The antenna array may comprise a radial array of directive elements, especially if intended for use at a base station.

In the context of a cellular telephony system, receivers embodying the invention could be used at either a base station or a mobile station. When used in a mobile station, the receiver usually would have a single receiver section with as many RF front end sections as the subset size, thus reducing RF hardware requirements. This is advantageous because the narrow beamwidth antenna element patterns—which may or may not overlap with one another—constitute a form of pre-filtering given the fact that any received signal (desired or interference) at an elevated base station will normally have most of its energy concentrated within a narrow cone. This spatial prefiltering is helpful because it reduces the number of elements (i.e. subset size) required to obtain a given level of performance.

Alternatively, the same prefiltering can be applied when, instead of a radial array of directive antenna elements, an array of omnidirectional antenna elements is used, followed by a preprocessing beamforming matrix. The said matrix provides as outputs linear combinations of the array elements' outputs where the linear combinations are chosen to emulate the patterns of a radial array.

Preferably, the signal processing unit measures said performance by monitoring statistics of the signals derived from the different subsets over a time period long enough to average out fast fading effects due to phase relationships of multipath components of the subset signals.

In essence, what is captured in the long-term statistics is the instantaneous value of the "shadowing" (i.e. slow fading) coefficients as well as the correlation properties of the fast fading (as opposed to its instantaneous values).

This arrangement advantageously allows the subset selection process to be performed relatively infrequently thus lowering the associated computational burden without undue performance penalty.

Preferably, the statistics gathered for the purpose of subset selection include an average (long-term) spatial (or space-time in a space-time embodiment) covariance matrix characterizing the desired signal and a similar covariance matrix characterizing the impairment lumped interference and thermal noise). Other statistics which could be employed include:

(i) Instantaneous (i.e. short-term) covariance matrices otherwise as described above;
(ii) Instantaneous desired signal power at all elements (and time delays in a space-time embodiment);
(iii) Instantaneous signal-to-interference-plus-noise ratio (SINR) at all elements (and time delays in a space-time embodiment);
(iv) Instantaneous desired signal power and interference power at all elements (and time delays in a space-time embodiment);
(v) Instantaneous desired signal power and short-term or long-term interference covariance matrix.

Other aspects of the invention include the receiver per se and the method of operating the array antenna receiver system.

According to another aspect of the invention, there is provided a method of receiving signals from a plurality of transmitting users using an array antenna having an array of antenna elements ($22/1, \ldots, 22/10$) and a receiver having a plurality of receiver sections ($12_0, \ldots, 12_7$), each corresponding to a different one of the users and coupled to the antenna elements by a switching means ($18_0$), the method comprising the steps of;

periodically selecting different subsets of signals from the antenna elements, processing and combining each subset of signals and determining potential performance of the receiver section of a particular user with that subset, determining which of the subsets would provide best performance, and controlling the switching means to change the signals comprising the subset of signals used by the corresponding receiver section.

Embodiments of the invention do not seek to identify all degrees of freedom of the desired users channel, but rather exploits the directivity of the array elements to select the S most significant elements in order to achieve the minimum mean-square error. Such a selection is not really based on identifying the degrees-of-freedom, or modes, of the desired users channel since interferers are also taken into account in the selection process. It is a procedure to intelligently reduce (by exploiting the geometry of the impinging waves) the number of array degrees-of-freedom that require active adaptation in order to achieve a proportional reduction in both numerical and hardware complexity.

The size of subset S will be assumed fixed and the most useful choices (depending on the desired complexity/performance tradeoff) are likely to be between 2 and 4 elements, inclusively. However, it should be pointed out that the essence of the invention does not depend on the size of the subsets being fixed and it is easy to imagine an extension where the subset size would be selected adaptively (e.g. signals with large angle spreads would be allocated larger subarrays).

For a fixed array subset size S, there are $$N_S = \binom{N}{S}, \tag{7}$$

possible subsets $[S_1, S_2, \ldots, S_{N_s}]$. The subset selection could theoretically be performed to minimize the mean-square error (or, equivalently, to maximize the signal-to-interference-plus-noise ratio (SINR)) according to:

$$S_{opt} = \max_{S_s} \left\{ c_0^{(S_s)H} R_{I+N}^{(S_s)-1} c_0^{(S_s)} \right\}, \text{ for } s = 1, \ldots, N_s, \tag{8}$$

where $c_0$ is the N×1 desired user signature (i.e. vector channel) across the array, $\widehat{a \times n}$ denotes the medium-term average of its argument and $R_{I+N}$ is the N×N short-term interference-plus-noise covariance matrix at the array input and can be expressed as a function of the interfering users signatures:

$$R_{I+N}^{(S_s)} = \sum_{m=1}^{M} c_m^{(S_s)} c_m^{(S_s)H} \tag{9}$$

where M is the number of co-channel interferers.

In almost all terrestrial propagation environments, it is well-known that narrowband (i.e. flat fading) wireless channels can be accurately represented in the short-term as either zero mean (Rayleigh-type fading) or non-zero mean (Rician-type fading) complex gaussian variables. It follows that a signature vector $c_m^{(S_s)}$ taken at any time instant is a complex gaussian vector characterized by its medium-term covariance matrix (and mean vector in the Rician case). In the rest of this document, Rayleigh fading will be assumed for the sake of clarity although the principles outlined and the invention itself apply just as well to the Rician case.

The selection criterion in (8) can be averaged over the small-scale fading and then rewritten in terms of the medium-term covariance matrices as follows;

$$S_{opt} = \max_{S_s} \text{ tr}\left[ \Sigma_0^{(S_s)} \Sigma_{I_0}^{(S_s)-1} \right], \text{ for } s = 1, \ldots, N_s. \tag{10}$$

where $\Sigma_0^{(S_s)}$ is the medium-term-averaged covariance matrix of the desired user vector channel over array subset $S_s$ and tr[·] stands for the trace of its matrix argument. Likewise, $\Sigma_m^{(S_s)}$ is the medium-term covariance matrix of the nth users vector channel over subset $S_s$ and $$\Sigma_{I_0}^{(S_s)} = \sum_{m=1}^{M} \Sigma_m^{(S_s)}$$

is the covariance matrix of the interference affecting user 0.

Basing the subset selection process on the medium-term statistics implies that subset selection can be performed at negligible numerical cost (e.g. as a background task) and may also reduce hardware requirements. Indeed, the medium-term covariance matrices can be assumed fixed for periods of the order of a second in mobile wireless systems

[23] and even longer in fixed wireless systems (such as proposed broadband wireless systems, e.g. the Local Multipoint Distribution Service (LMDS)).

It should be noted that the system described here does not rely on multi-user information (although some minor algorithmic reduction in complexity is possible in a multi-user context) and can thus constitute a more natural upgrade path for existing systems where each users signal is typically processed independently. Also, the relative reduction of complexity is approximately the same whether the system is implemented as a narrowband processor (in flat fading environments) or a wideband processor (in dispersive fading environments).

BRIEF DESCRIPTION OF THE DRAWINGS

Embodiments of the invention will now be described by way of example only and with reference to the accompanying drawings, in which.

DETAILED DESCRIPTION OF PREFERRED EMBODIMENTS

Figure 1:
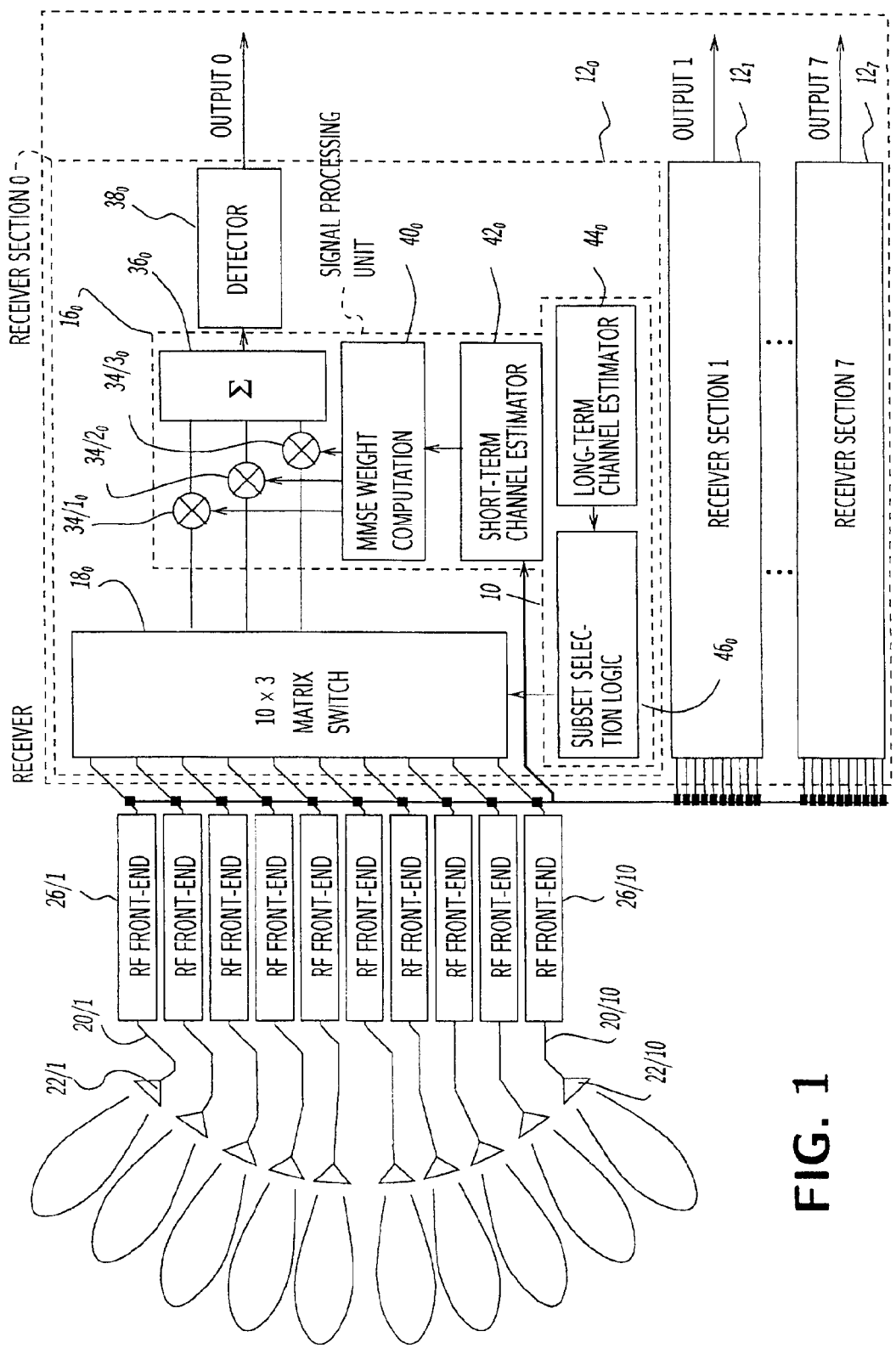
FIG. 1 is a simplified block schematic diagram of part of an array antenna radio receiver system, for a SDMA system, comprising a first embodiment of the invention.

Referring to FIG. 1, an array antenna receiver system for receiving signals from a plurality of user transmitters (not shown) comprises an antenna having a plurality of antenna elements, specifically 6 elements $22/1, \ldots, 22/10$, coupled by way of a bank of radio frequency (RF) front end units $26/1, \ldots, 26/10$ to an array receiver which has several receiver sections, one for each of the user transmitters. Eight receiver sections $(0, 1, \ldots 7)$ are illustrated, but there could be more.

The RF "front-end" units $26/1, \ldots, 26/10$ are identical and of conventional construction. Only one will be described, with reference to the inset diagram in FIG. 5. As shown inset in FIG. 5, RF front-end unit $26/1$ comprises a RF/IF downconverter $28/1$, a channel filter $30/1$ (which isolates only the required channel and rejects out-of-band noise and interference), and an analog-to-digital converter unit $32/1$ for performing bandpass sampling. Alternatively, the IF or RF signal could be downconverted to baseband prior to A/D conversion. The output of the A/D converter unit $32/1$ is also the output of RF front-end unit $26/1$ and is coupled to each of the array receiver sections.

The receiver sections are identical so only that for user $\mathbf{0}$ is shown in detail and will be described with reference to FIG. 1 again.

Receiver section $\mathbf{0}$ comprises a selector unit, specifically a RF $6 \times 3$ matrix switch $18_0$, having six input ports $20/1_0, \ldots, 20/10_0$, connected to respective outputs of the six RF front-end units $26/1, \ldots, 26/10$, and three output ports connected to respective data inputs of a signal processing unit $16$. A control input of the matrix switch $18_0$, is connected to a control signal output of the signal processing unit $16_0$. The outputs of all six RF front-end units $26/1, \ldots, 26/10$ are connected to the signal processing unit $16_0$. The signal processing unit $16_0$ can be implemented as a custom Very Large Scale Integration (VLSI) chip, a Field Programmable Gate Array (FPGA) or as software running on a Digital Signal Processor (DSP).

The signal processing unit $16_0$ performs signature (i.e. desired user vector channel) and covariance matrix estimation, MMSE processing, weighting and combining, matched filtering and detection of symbols. The latter two are standard digital radio receiver operations and so are not depicted specifically in FIG. 1 and will not be described in detail herein.

Again, for simplicity of description, operation of only the signal processing unit $16_0$ for the one desired user m is depicted in FIG. 1 and will be described; it should be appreciated that similar signal processing units will be provided for the other users (transmitter stations) and will process the corresponding subset of signals.

The three outputs of the RF matrix switch 180 are shown connected within the signal processing unit $16_0$ to multipliers $34/1_0, 34/2_0$ and $34/3_0$, respective outputs of which are coupled to a summing device $36_0$ whose output is coupled to later stages of the receiver, via a detector $38_0$, which is conventional and need not be described in detail here.

The multipliers $34/1_0, 34/2_0$ and $34/3_0$ multiply the digital signals from the three RF front-end units $26/1, 26/2$ and $26/3$ by weights $w_1(0), w_2(0)$ and $w_3(0)$, respectively, supplied by a minimum mean square error (MMSE) computing unit $40_0$ which functionally is implemented by the signal processing unit $16_0$. The MMSE weight computation unit $40_0$ updates the weights using MMSE criteria in known manner according to equation 5, supra.

The signal processor unit $16_0$ also performs the subset selection process and so is shown as including a short term channel estimator $42$ connected to the RF front end units, a long term channel estimator $44_0$ and a subset selector unit $46_0$, conveniently a logic circuit. The short term channel estimator $42_0$ extracts channel parameters using the signals from the RF front-end units and supplies them to the MMSE weight computations means for use in updating the weights being used for a particular subset of signals. The long term channel estimator $44_0$ monitors long term statistics and uses them to determine whether or not to control the matrix switch $18^0$ to select a different subset of signals for a particular user. The subset selector unit $46_0$ could, of course, be separate from the processor unit $16_0$.

In operation, the signal processing unit $16_0$ monitors the signals from all six of the antenna elements $22/1, \ldots, 22/10$, conducts statistical analysis upon each different subset of the prescribed number of elements (three in this case) and periodically operates the matrix switch $18_0$ to select a different trio of the antenna elements $22/1, \ldots, 22/10$ if the current subset selection is producing inferior performance than would be expected using one of the other subsets, as will be explained more fully later.

Operation of the array receiver shown in FIG. 1 will be described in general terms for user $\mathbf{0}$ and on the basis that the subarray subset size S is fixed. It should be noted that, as is conventional, in the following description, the desired user is deemed to be user 0 and the interferers are deemed to be users 1 to M; hence there are M+1 users in the system.

Moreover, without loss of generality, the description will assume the narrowband case. Hence, each branch in a selected subset is multiplied by a single complex weight (as opposed to being filtered by a full equalizer).

Figure 2:
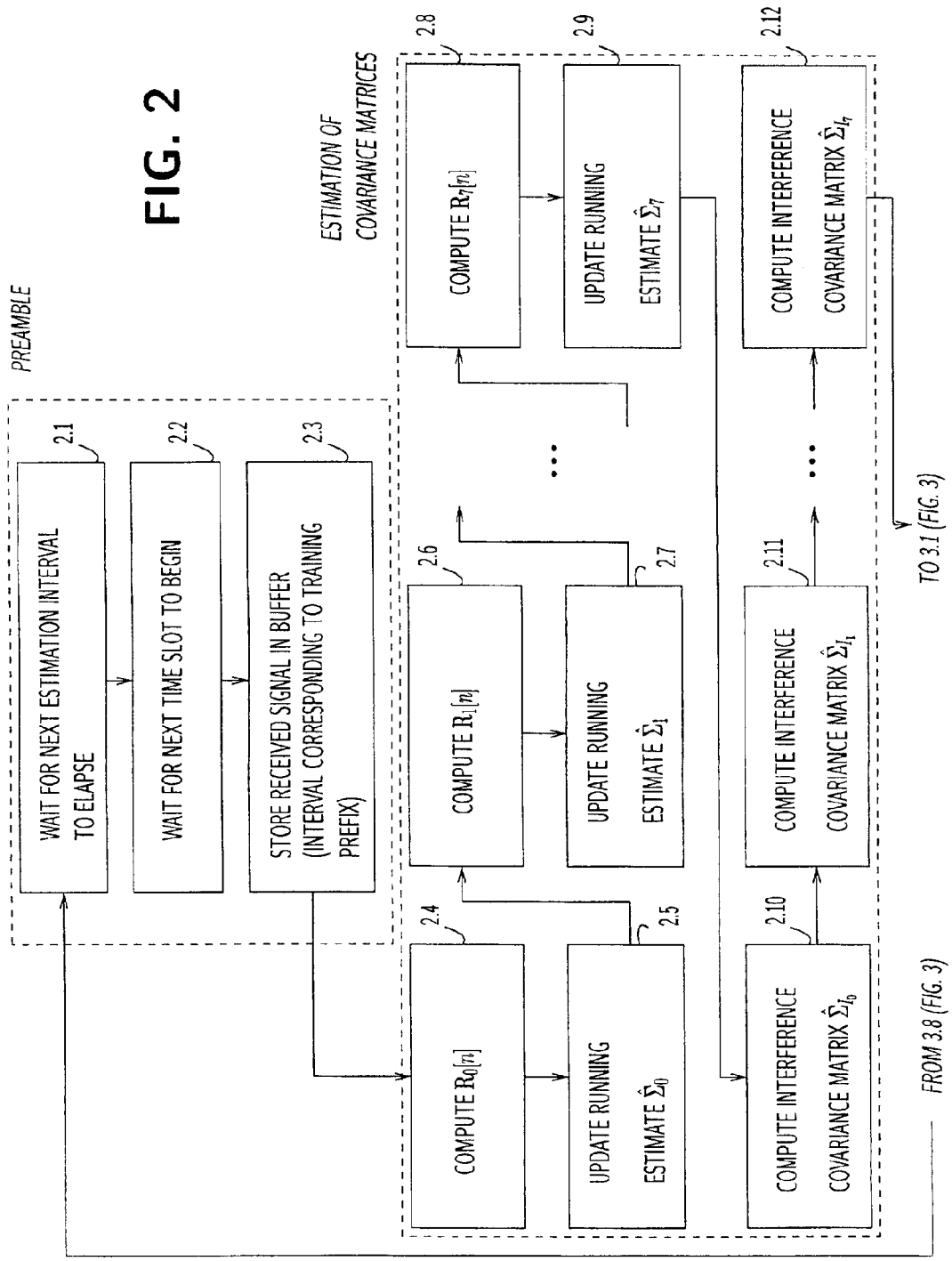
FIG. 2 is a flowchart depicting computation of estimates of covariance matrices in the receiver system of FIG. 1.
Figure 3:
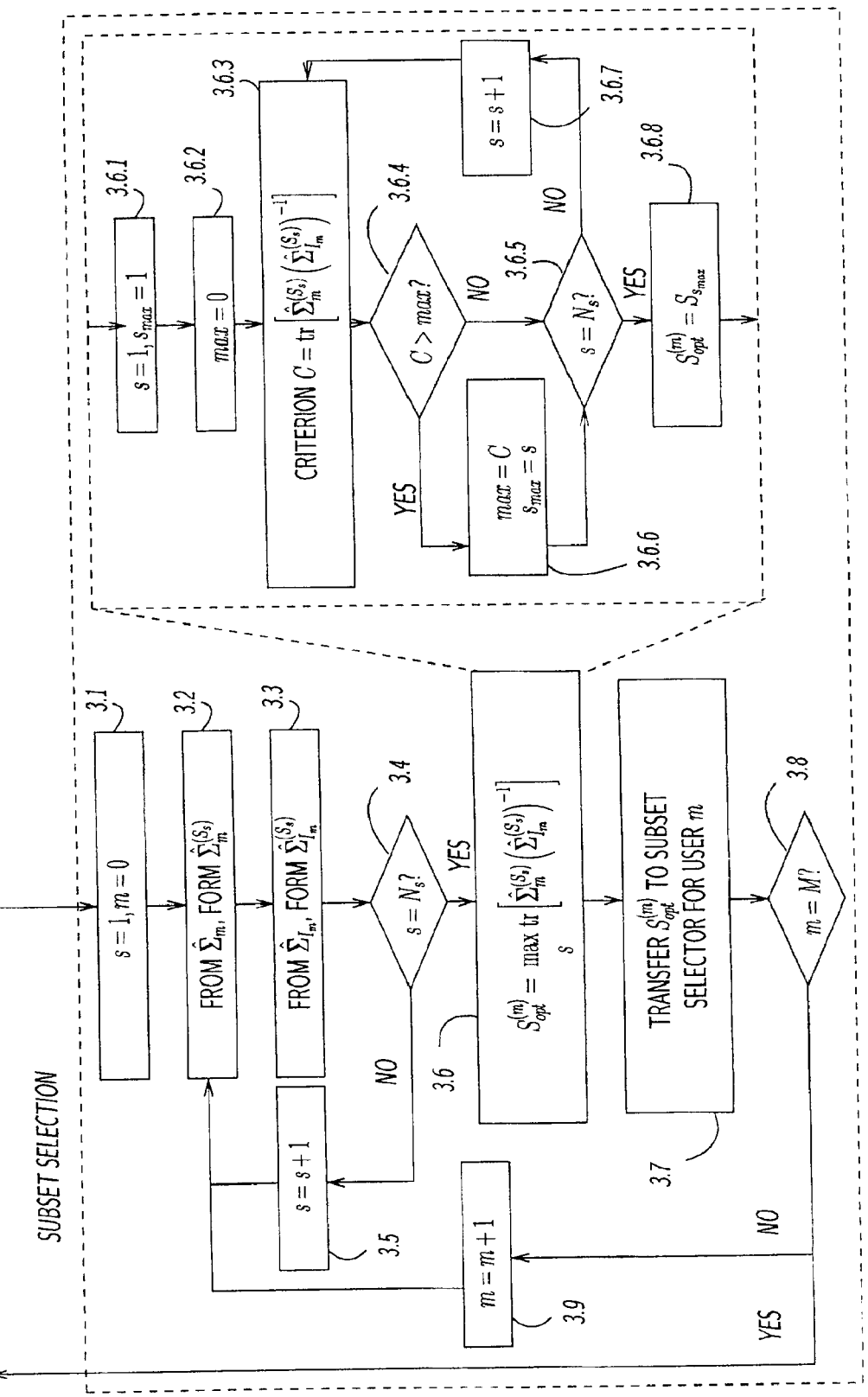
FIG. 3 is a flowchart depicting determination of subset selections in the receiver system of FIG. 1.
Figure 4:
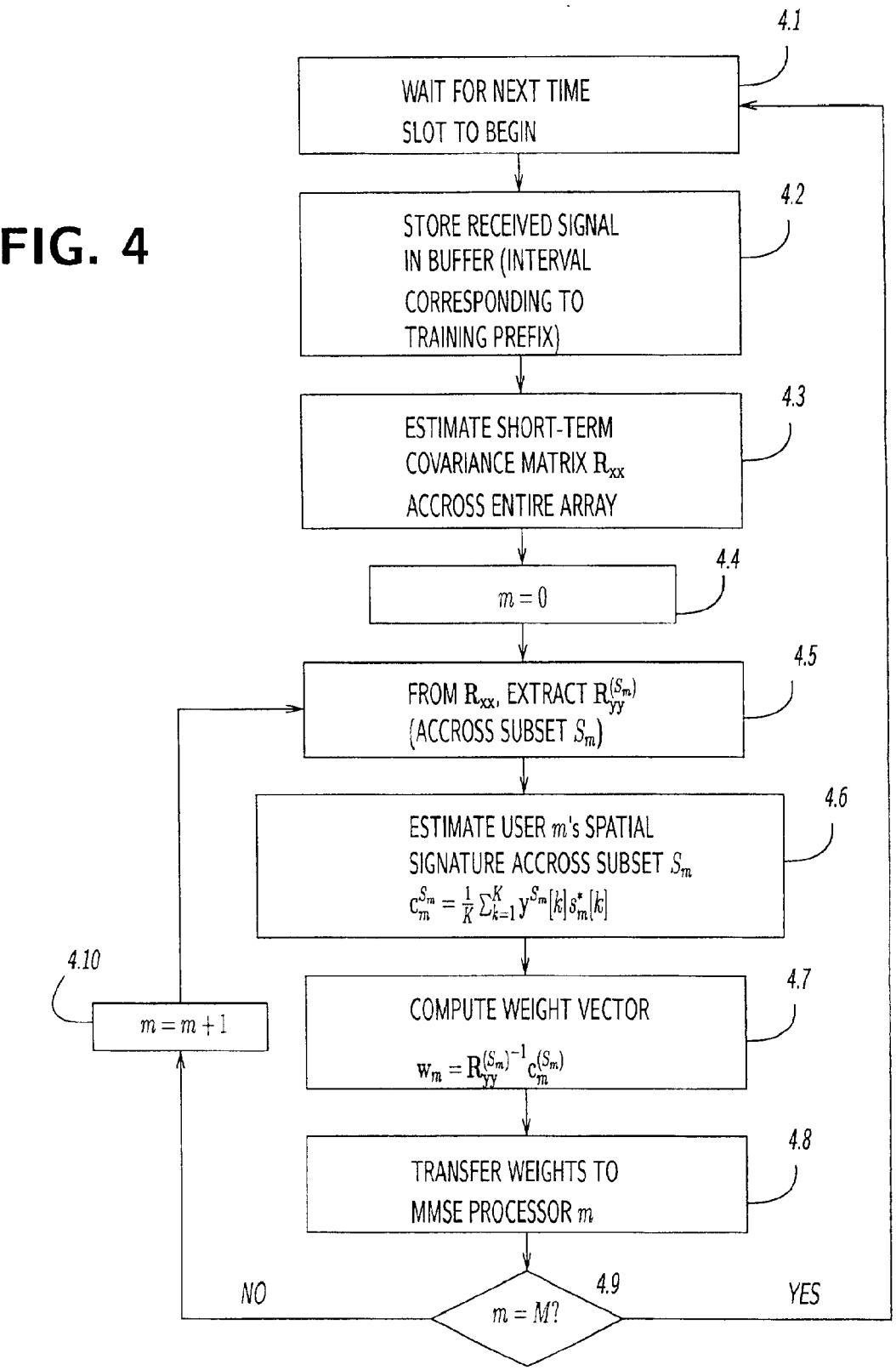
FIG. 4 is a flowchart depicting computation of MMSE weight vectors in the receiver system of FIG. 1.

In operation, the long term channel estimator $44_0$ of the signal processor unit $16_0$ uses a "long term" loop, illustrated in FIGS. 2 and 3, to compute subset selection for a particular user based upon measurements of the performance of the receiver with different subsets of the antenna elements and the short term channel estimator $42_0$ uses a "short term" loop, illustrated in FIG. 4, to compute and update weights to optimize the performance with the selected subset.

Implementation using SDMA implies that the receiver must handle simultaneously multiple users on the same carrier frequency.

Long-term Loop of SDMA Implementation

The long-term loop updates the estimates of the long-term covariance matrix. The covariance matrix embodies the statistical characteristics of the time-varying channel for a particular user, user 0 in this case. Since each element of the receiving array "sees" a slightly different channel, the overall channel can be represented as a vector of N elements and characterized by an N×N covariance matrix. In this case, the long term estimator $44_0$ of signal processing unit $16_0$ computes a long-term covariance matrix, that is a matrix which has been measured and averaged over a period which is long enough to eliminate the effect of the multipath fading (also called fast fading). As a result, enough information is retained to identify the principal modes of the fading process (which correspond to the larger eigenvalues of the covariance matrix) even without the instantaneous behavior of the fading process being known. The said modes change at a much slower rate than the multipath fading itself but do in themselves provide enough information to preprocess the signals intelligently. Use of the long-term covariance matrix in selecting the optimal subsets thus makes subset selection a long-term, inexpensive (in terms of processing power and/or hardware complexity) process. The actual fading fluctuations are dealt with entirely within the optimal subsets by the short-term loop, as will be described later.

The flowcharts shown in FIGS. 2 and 3 represent two distinct sections of the long-term loop: the portion illustrated in FIG. 2 is the long-term covariance matrix estimation while FIG. 3 corresponds to determination of the subset selection. Hence, the subset selection is based strictly on long-term information and does not take into account the instantaneous multipath fading. This is suboptimal, but the performance penalty is deemed to be more than compensated by the reduction in complexity thus achieved.

While the receiver comprises ten antenna array elements 22/1, . . . , 22/10 and ten RF front-end sections 26/1, . . . , 26/10, they are each shared by a pool of receiver sections $12_0$, . . . , $12_7$, one for each desired user. The receiver sections $12_0$, . . . , $12_7$ have user's signal processing units $16_0$, . . . , $16_7$, respectively, each of which may be mapped to a different subset of antenna elements. The patterns of these array element subsets are in turn determined by the MMSE spatial filtering performed by the short-term loop. Since each of these patterns can be effectively "steered" to favour a desired signal and null interferers, many users can coexist on the same carrier frequency. Hence, in this SDMA implementation, what the signal processing unit corresponding to one user rejects as interference can be a desired signal to the signal processing unit corresponding to another user.

It is assumed without loss of generality that this is a packet-based system. Each user is assigned a unique training sequence which is incorporated in the packet (e.g., as a prefix, a suffix, a "mid-amble" as in the GSM cellular telephony standard, or as a sequence distributed throughout the packet). The training sequence is determined and assigned by whatever network protocol applies within the system, i.e., it could be fixed or it could be assigned upon entry into the network, or some other way of establishing agreement between the base station and the subscriber station as to which training sequence should be used for their communications.

It is also assumed that the packets are of fixed length and that this length is shorter than the coherence time of the channels in the intended band and environment of operation. This implies that a packet is short enough that the multipath fading channel can be considered fixed over its duration.

Extensions of the implementation described herein to systems with longer and/or variable-length packets (e.g., longer than the coherence time of the channels), to CDMA systems (where the user's codes can be exploited as continuously-present training sequences) and to non-packet systems will be obvious to practioners of the art.

In this preferred embodiment, each packet contains the known training sequence of 32 bits and this is used by each of the receiver sections to identify a given signal from the corresponding user and extract its channel characteristics through correlation. The information thus gathered from each packet is used to update the long-term covariance matrices used in subset selection. It is also used immediately by the short-term loop to adapt the weights of the combiner/spatial filter, thus determining the pattern of the array subset which will best enhance reception of the desired signal and reject the interferers.

Accordingly, as evidenced by the flowchart in FIG. 3, the receiver is concerned with the received training sequences rather than the entire content.

With the goal of continuously updating the long-term covariance matrices, the receiver will sample the packets periodically, maybe every third packet or so, extract the training sequence and then compute the channel parameters using that particular training sequence. This sampling rate defines what will be called the estimation interval. If the packet arrival rate is variable, an appropriate strategy should be devised (instead of picking every nth packet) so that the sampling interval remains fairly constant in time.

Referring now to the flowchart in FIG. 2, steps 2.1, 2.2 and 2.3 merely comprise a preamble to detect the beginning of the estimation interval and next time slot and capture the training sequence; and are self-explanatory in step 2.4, the processor 14 computes the short-term covariance matrix for user 0 ($\hat{R}_0$) To situate this operation properly in time, an index i is introduced so that $\hat{R}_i$ is the short-term covariance matrix estimate obtained during the ith estimation interval. Assuming that the training sequence 0 ($S_0$) for the user has a length of K symbols and the vector x[k,i] is the overall received vector across the array corresponding to the kth symbol of the training sequence in the ith estimation interval; the covariance matrix estimate is obtained in step 2.4 by correlation with the training sequence as follows:

$$\hat{R}_0[i] = \left(\sum_{k=1}^{K} x_{(k,i)} s_0[k]\right)\left(\sum_{k=1}^{K} x_{(k,i)}^H s_0^*[k]\right) \quad (11)$$

where $s_0[k]$ is the kth symbol in user 0's sample training sequence.

Therefore, $R_0[i]$ is the ith estimate of the short-term covariance matrix derived from a single packet for user 0. It is equal to the estimate of user 0's vector channel (obtained by correlation with the training sequence) multiplied by its transposed conjugate. Mathematically, this is expressed $\hat{R}_0[i] = \hat{c}_0 \hat{c}_0^H$.

Hence, the vector channel estimate for any user m is obtained by correlation as $$\hat{c}_m = \sum_{k=1}^{K} x_{(k,i)} s_m[k]. \quad (12)$$

In step 2.5, the running estimate of user 0's long-term covariance matrix ($\hat{\Sigma}_0$) is updated according to $$\hat{\Sigma}_0[i] = \gamma \hat{\Sigma}_0[i-1] + \frac{1-\gamma}{K} \hat{R}_0[i], \quad (13)$$

where $\hat{\Sigma}_0[i-1]$ is the estimate from the previous estimation interval and $\gamma$ is the forgetting factor. This factor will typically take values between 0.8 and 0.99 and determine at what rate new information (embodied by $\hat{R}_0[i]$) will replace old information obtained in previous estimation intervals. Its value is chosen according to how fast the channel parameters are changing and how often the estimates are being taken. Generally, higher values of $\gamma$ imply that information obtained in previous estimates has a longer life, i.e., it is forgotten slowly.

There are similar steps to compute the covariance matrix estimates for every user m (with m=0 . . . M). Thus, FIG. 2 shows steps 2.6 and 2.7 which correspond to steps 2.4 and 2.5 and compute the covariance matrix estimates for user 1 and steps 2.8 and 2.9 which correspond to steps 2.4 and 2.5 and compute the covariance matrix for user 7, the last user in this example. Depending on low-level implementation details, the covariance matrices can be computed for all users simultaneously (i.e., if parallel processing is employed and/or if replicated signal processing hardware has been provided to that effect) or sequentially (as in a single processor firmware implementation or a single dedicated signal processing circuit is being reused).

Once covariance matrices have been computed for all users, these are used in turn to compute, for each user, an interference covariance matrix estimate, ie., a covariance matrix characterizing the sum of the interfering signals seen by the user in question, that is all users but the user in question. One possible method to compute $\hat{\Sigma}_{1_m}[i]$, the interference covariance matrix for user m, is by summing the covariance matrices for all users but user m, i.e.

$$\hat{\Sigma}_{I_m}[i] = \sum_{\substack{m=0 \\ m \neq 0}}^{M} \hat{\Sigma}_m[i]. \quad (14)$$

Steps 2.10, 2.11 and 2.12 in FIG. 2 illustrate this for users 0, 1 and 7.

FIG. 3 illustrates by a flowchart the process of selecting antenna element subsets, which is also part of the long-term loop. The starting point of the flowchart in FIG. 3 is in fact the input of all the covariance matrices and interference covariance matrices from FIG. 2.

Since there are 10 antenna elements and that the subsets each have a size of 3 elements, there are 120 possible such combinations of elements. Consequently, the selection algorithm will cycle through every one of those combinations and determine, for each subset, a performance criterion (based on long-term channel information gathered in the process of FIG. 2) and select for each user the subset which yields the maximum value of that performance criterion. It should be noted that each user will in general be assigned a different subset. This is why in the SDMA implementation there is a RF front-end unit for every element, i.e. in the receiver of FIG. 1, there is one of the RF front-end units 26/1, . . . , 26/10 for each of the elements 20/1, . . . , 20/10.

In a non-SDMA implementation, as will be describer later, there is a single desired user and therefore a single subset of RF front-end units is active at all times. Therefore, only as many RF front-ends as the subset size (3 in this example) are required and these can be assigned dynamically through RF switches to the array elements making up the selected subset.

Thus, step 3.1 sets subset index s to 1 and user index m to 0. In step 3.2, the 10×10 element covariance matrix for user m will be used to form (by picking the appropriate rows and columns corresponding to the elements of the subset) a 3×3 covariance matrix or submatrix for user m and subset selection s=1. In step 3.3, the same thing is done to the interference covariance matrix for user m to form a subset interference covariance matrix for user m. Step 3.4 determines whether or not the subset index equals the maximum, in this case 20; if it does not, it increments the subset index and repeats steps 3.2 and 3.3.

Once the subset covariance matrices and subset interference covariance matrices have been created for all possible subsets, step 3.6 determines the optimum subset $S_{opt}^{(m)}$ for user m. This is done by computing a performance criterion for every possible subset and selecting 30 the subset that yields the highest value of the said criterion. Thus;

$$S_{opt}^{(m)} = \max_S tr\left[ \sum_m \sum_{l_m} \frac{(\hat{S}_g)}{(\hat{S}_g)} \right]^{-1} \quad (15)$$

The invention embraces the use in step 3.6 of a number of different performance criteria based on long-term information. In this implementation, however, the chosen criterion is essentially a measure of the best possible achievable SINR for a given subset on average (since it is based on long-term information).

In step 3.7, the optimum subset is transferred to the subset selector for user m and step 3.8 determines whether or not this process has been performed for all of the users. If it has not, step 3.9 increments the user index and steps 3.2 to 3.8 are repeated.

Once the optimum subset has been computed for every desired user, step 3.8 returns the algorithm to the very beginning, i.e., the long-term loop is repeated, starting with step 2.1 which waits for the next estimation packet to arrive. It is presumed that every packet includes a training sequence, but the long-term loop samples them periodically.

In FIG. 3, step 3.6 is shown in more detail in an inset diagram. As shown in the inset diagram, step 3.6.1 again sets the subset index s to one and sets another index ($S_{max}$) representing the best or optimum subset also to one.

Step 3.6.2 then sets a variable max equal to 0 and step 3.6.3 computes a measure of SINR (the performance criterion) which we call C. This criterion is computed as the trace of the covariance matrix estimate for user m and subset $S_1$ times the inverse of the interference covariance matrix estimate for user m and subset selection $S_1$. This is expressed $$C = tr\left[\sum_m (\hat{\Sigma}_{l_m}^{(S_g)} \hat{\Sigma}^{(S_g)})^{-1}\right]. \quad (16)$$

In step 3.6.4, the criterion computed in 3.6.3 is compared with the mar variable which n step 3.6.2 was initially set to 0. If C>max then step 3.6.6 lets max=C and $S_{max}$=s since the current subset is the best subset so far. In step 3.6.5, it is verified whether he last subset (s=$N_s$) has been reached. If not, s is incremented in 3.6.7 and steps 3.6.3–3.6.5 are repeated. Once all subsets have been processed, $S_{max}$ contains the index of the best subset for user m and therefore step 3.6.8, lets $$S_{opt}^{(m)} = S_{s_{max}}.$$

Short-term Loop for SDMA Implementation

Once the subset selections have been made for each of the users for that particular estimation interval, the next step is to optimize the performance of each subset. This entails adjusting the weights that are used in processing the signals from the antenna elements in each particular subset, as will be described with reference to the flowchart shown in FIG. 4. The weights are updated continually in parallel with, and at a faster rate than subset selection. In fact, the short-term loop is performed once for every packet received. In FIG. 4, it is assumed that packets for all M+1 users are received simultaneously and hence steps 4.5–4.9 are repeated for every user.

Thus, step 4.1 waits for the next time slot to begin and then step 4.2 stores the received signal, i.e., the vector for the entire array of 10 elements, in a buffer for the interval corresponding to the training prefix. This implies that packets for all users are synchronized and all training sequences are received simultaneously. In systems where this is not the case, appropriate adjustments can easily be made. It is the interval corresponding to the reception of the training sequences which is stored for further processing.

In step 4.3, an estimate is taken of the short-term overall covariance matrix $R_{xx}$ over the entire array of elements. This is done according to $$\hat{R}_{xx} = \sum_{k=1}^{K} \frac{x[k]x^H[k]}{K} \quad (17)$$

Hence, K symbols are captured by step 4.2 and these symbols are processed by computing the sum over k of the kth sample x[k] multiplied by its complex conjugate transpose $X^H[k]$ and dividing the result by K.

Step 4.4 then sets the user index m to 0 and step 4.5 extracts from the matrix $\hat{R}_{xx}$ a submatrix $$\hat{R}_{yy}^{(S_-)}$$

which is the set of elements out of $\hat{R}_{xx}$ which corresponds to the current chosen subset $S_m$ for user m thus yielding a 3×3 matrix.

Step 4.6 estimates user m's spatial signature across the subset $S_m$ according to the expression $$\hat{c}^{S_m} = \frac{1}{K}\sum_{k=1}^{K} y^{S_m}[k]s_m^*[k], \quad (18)$$

where $y^{S_m}[k]$ is the received signal vector across subset $S_m$ corresponding to the kth symbol in the training sequence and $S^*_m[k]$ is the complex conjugate of the kth symbol of the training sequence for user m.

It should be noted that the equation above for step 4.6 is basically very similar to the one in box 2.4 except that it is computed across subset $S_m$ instead of across the entire array.

In step 4.7, the spatial signature computed in step 4.6, i.e., $\hat{c}_m^{(S_m)}$ (or the vector channel estimate across only the subset of elements rather than the entire array) is used to compute the weight vector according to $$w = \{R_{yy}^{(S_m)}\}^{-1}\hat{c}_m^{(S_m)}. \quad (19)$$

This weight vector comprises a series of weights, one for each element of the subset. Hence, in the specific embodiment, where there are three elements in each subset, there would be three weights. These weights are then transferred (step 4.8) to the MMSE processor for user m where they are used to multiply the signals from each element of the subset prior to summation to derive the best estimate of the desired signal in the MMSE (Minimum Mean-Square Error) sense.

Step 4.9 then determines whether or not the user index m is set to M, i.e., the weights have been computed for all the desired users. If not, step 4.10 increments the user index m to m+1 and steps 4.5 to 4.9 are repeated.

Once all the weight vectors have been computed, step 4.9 returns the algorithm to step 4.1 to wait for the beginning of the next time slot whereupon the weights will be computed again and updated.

For the purpose of comparing complexity, assume, for example, a 10 Mb/s system with packets of 68 bytes (roughly the size of an ATM cell including a training sequence). A guard byte is inserted between each pair of successive packets. Consider a set of 8 users who send packets simultaneously once every ten slots on the same carrier. Since there are 18115.94 slots per second, the users of interest are transmitting at a rate of 1811.59 packets per second. At this rate, channels typically will be sufficiently different from one packet to the next due to multipath fading to warrant retraining at every packet. Furthermore, each packet contains a known training sequence of 32 bits. The long-term covariance matrix is assumed to have a worst-case 90% correlation time of 0.5 s; its estimate will be updated every 0.1 s and the subset selection will also be performed every 0.1 s.

In the case of the radial array of 10 antenna elements with a subset size of 3, the relative computational load with respect to conventional MMSE array processing is roughly 26%. With a subset size of 2, it is approximately 20%.

In the case of a multi-user receiver, there is no advantage in having the RF switch immediately after the antenna elements since it is likely that the collectivity of users, each using a different subset of elements, will at some instants in time require all elements to be active. In other words, the union of all subsets can at times include all elements in the array and thus N RF front end units are required. Assuming all M co-channel interferers are in this case valid users, there are M+1 distinct signal processing units which also can be physically distinct (in separate integrated circuits or DSP units) or combined in a single multi-user unit or partitioned into any number of physical units in any way according to practical design considerations It will be appreciated that the invention is not limited to SDMA receiver systems. Application to a SDMA receiver system will now be described by way of example with reference to mainly to FIGS. 5, 6 and 7. It should be noted that the short-term loop illustrated in FIG. 4 is almost the same for both SDMA and non-SDMA implementations. Also, in the long-term loop of a non-SDMA implementation, the receiver deals with only one desired user at a time per carrier. The receiver would be replicated for other users existing at other carriers (as would be the case in a SDMA embodiment too).

Figure 5:
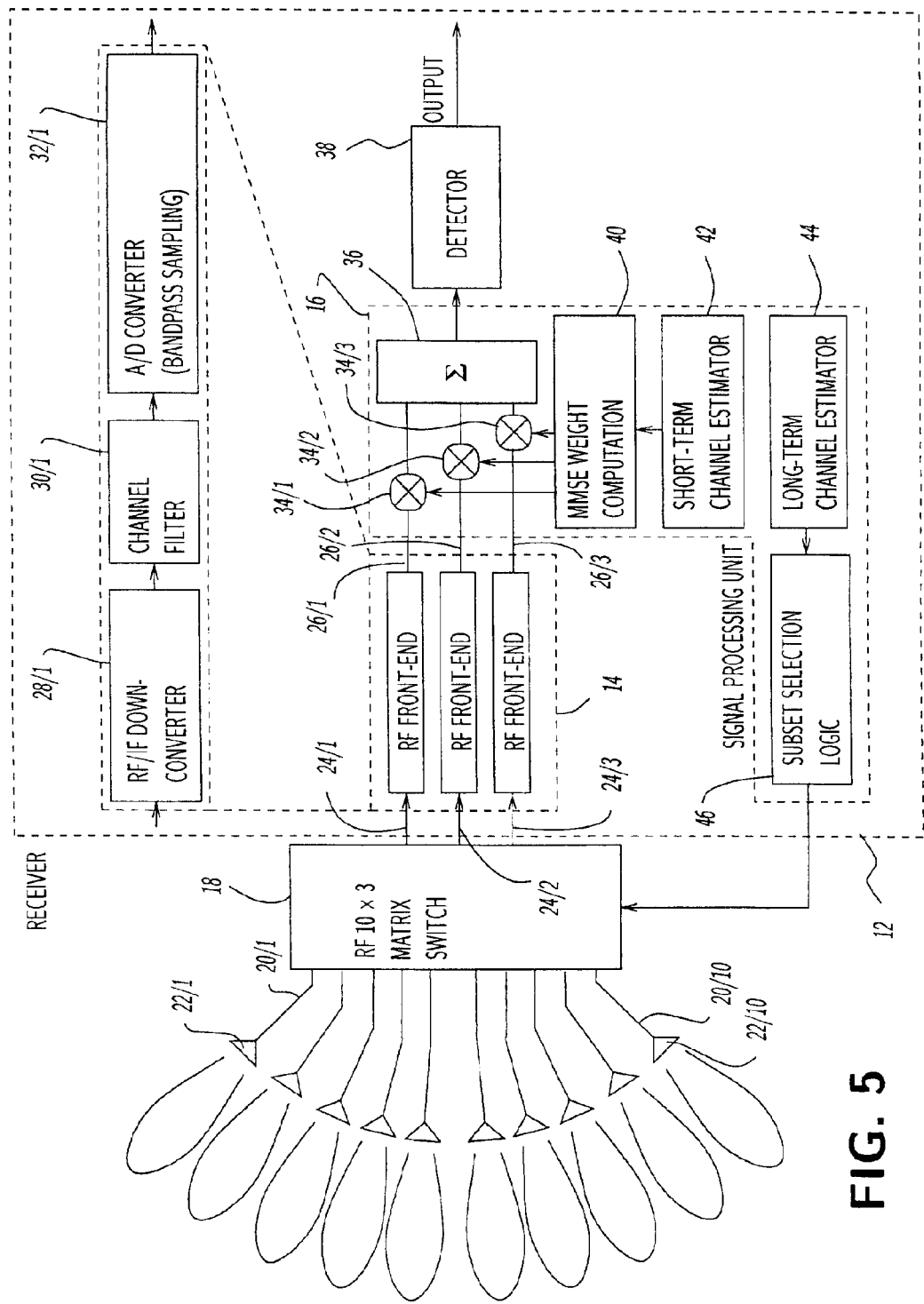
FIG. 5 is a simplified block schematic diagram of a receiver system for SDMA, which is a second embodiment of the invention.

Referring to FIG. 5, in which components corresponding to those in the receiver system of FIG. 1 have the same reference numerals, an array antenna receiver system for receiving signals from a plurality of user transmitters in a non-Space Division Multiple Access (SDMA) system (e.g.wireless LAN, cellular telephone) comprises an antenna having a plurality of antenna elements 22/1, ... , 22/6 coupled to an array receiver 12 which comprises a radio frequency unit 14 and a signal processing unit 16. The antenna unit is connected to the receiver 12 by a selector unit 18 which is a radio frequency matrix switch having six input ports 20/1, ... , 20/6 coupled to respective ones of a radial array of antenna elements 22/1, ... , 22/6 and three output ports 24/1, 24/2 and 24/3 coupled within the radio frequency unit 12 to RF front end units 26/1, 26/2 and 26/3, respectively.

The RF "front-end" units 26/1*m*, 26/2*m* and 26/3*m* are identical and of conventional construction. As shown inset in FIG. 5, RF front-end unit 26/1 comprises a RF/IF downconverter 28/1, a channel filter 30/1 (which isolates only the required channel and rejects out-of-band noise and interference), and an analog-to-digital converter unit 32/1 for performing bandpass sampling. Alternatively, the IF or RF signal could be downconverted to baseband prior to A/D conversion. The output of the A/D converter unit 32/1 (which is also the output of RF front-end unit 26/1) is coupled to the signal processing unit 16 which can be implemented as a custom Very Large Scale Integration (VLSI) chip, a Field Programmable Gate Array (FPGA) or as software running on a Digital Signal Processor (DSP).

The signal processing unit 16 is nearly identical to that described with reference to FIG. 1 and so will not be described again. As before, it performs signature (i.e. desired user vector channel) and covariance matrix estimation, MMSE processing, weighting and combining, matched filtering and detection of symbols. Also, it performs the subset selection process using a long-term channel estimator 44 which controls the matrix switch 18 and updates the MMSE weights for a particular subset selection by means of short term channel estimator 42.

In this case, the signal processor 16 will operate the matrix switch 18 periodically to take the receiver section "off line" temporarily while it selects one of the other subsets and obtains the sample of the training sequence. This will be repeated for each of the other subsets in turn to obtain the long-term statistics. Depending upon the system, it may be necessary to acquire the long-term statistics by selecting the same subset several times during such "off line" intervals.

Long-term Loop for Non-SDMA Implementation

Just like in the SDMA implementation, the long-term loop updates the estimates of the long-term covariance matrix. In this case, however, there is only one desired user which is user 0. Indeed, it is assumed that carrier frequencies are not reused within a single cell or sector but rather the array serves to improve link quality by combatting interference on the same carrier from neighbouring cells or sectors possibly reducing the carrier reuse distance.

Figure 6:
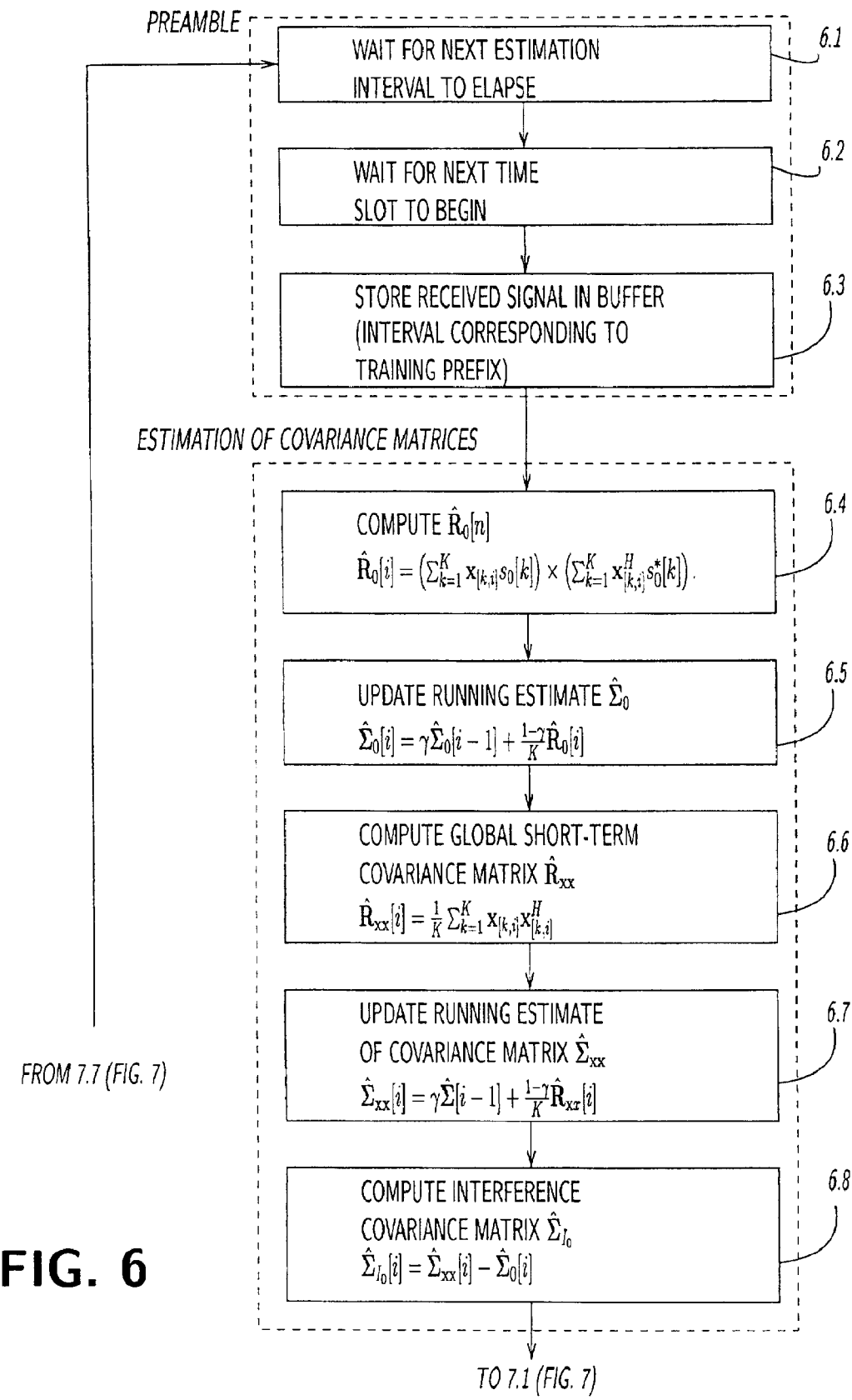
FIG. 6 is a flowchart depicting computation of covariance matrices in a receiver system which does not employ SDMA.
Figure 7:
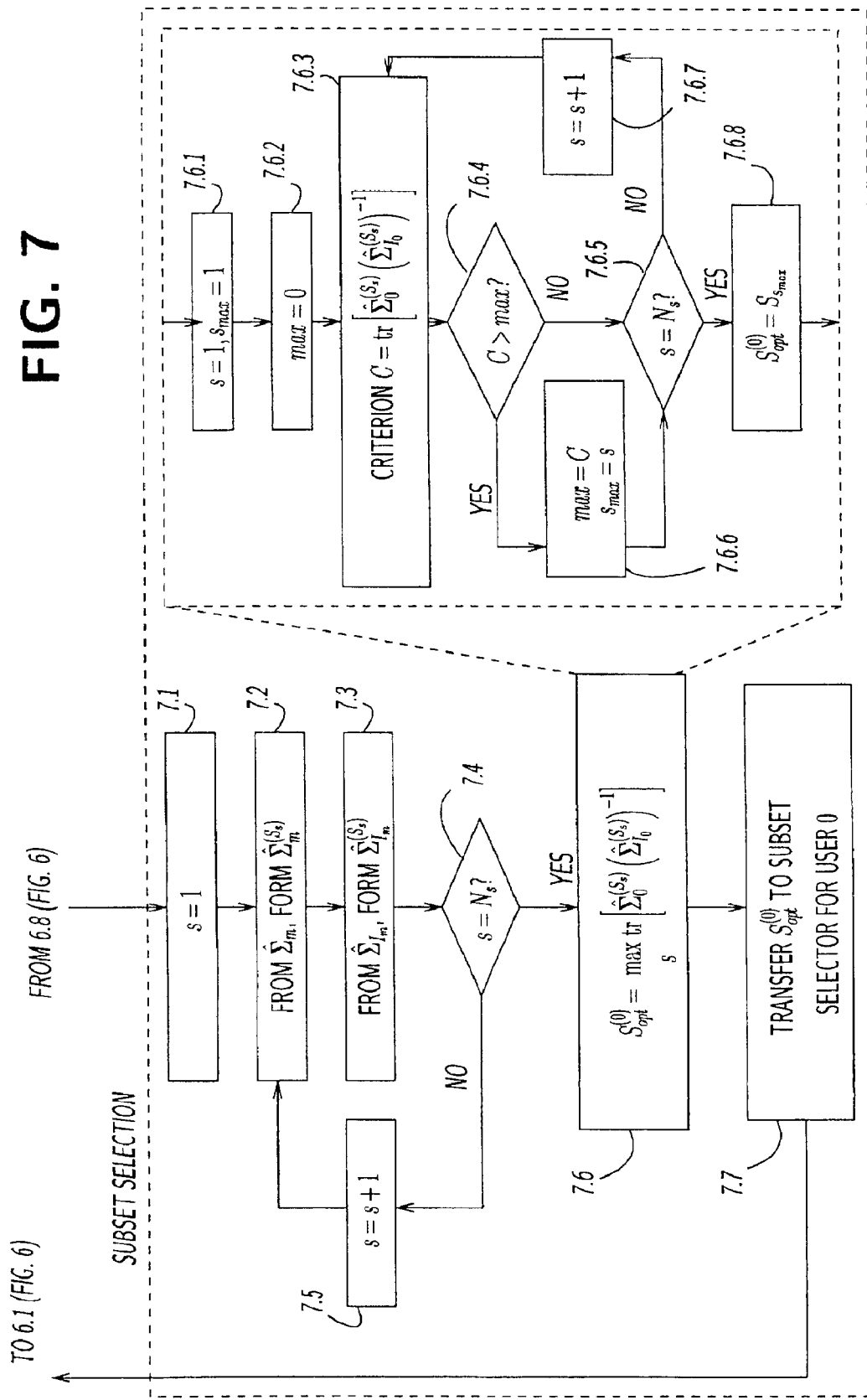
FIG. 7 is a flowchart depicting determination of subset selection in the receiver system of FIG. 5.

The long-term is composed of two main sections: the portion illustrated in FIG. 6 is the long-term covariance matrix estimation while FIG. 7 corresponds to subset selection.

In this non-SDMA implementation, because a single received signal processing unit is required, for user 0, it has exclusive usage of the antenna array and the RF front-end section. It follows that the number of RF front-ends required is determined by the subset size (i.e., 3 in the specific implementation) instead of the array (i.e., 10).

This implementation also assumes that the system is packet-based with packets being shorter than the channel coherence time. Furthermore, adaptation (that is extraction of useful channel parameters) is based on the presence of a training sequence as a preamble (or postamble or midamble or distributed sequence) to the main packet body. The system assumptions are generally similar to the SDMA implementation except for the following points:

Since there is only one desired user, the interferers' packets need not be synchronized with the desired user's packets. In fact, the structure of the interferers' signals is entirely irrelevant and they need not be packet-based at all.

Since no covariance matrix estimate is needed for the individual interferers, a different method than the one described in the SDMA implementation is called for to compute the interference covariance matrix.

Referring to FIG. 6, steps 6.1, 6.2 and 6.3 are identical to steps 2.1, 2.2 and 2.3 of the SDMA implementation. Likewise, steps 6.4, 6.5 compute the running estimate $\hat{\Sigma}_0[n]$ in a manner identical to steps 2.4 and 2.5. Steps 6.6, 6.7 and 6.8 introduce a new method of calculating the interference covariance matrix (which could also be employed in an alternative SDMA implementation). In step 6.6, the overall short-term covariance matrix is computed according to $$\hat{R}_{xx}[i] = \sum_{k=1}^{K} x_{[k,l]} x_{[k,l]}^{H}. \tag{20}$$

In step 6.7, $\hat{R}_{xx}[i]$ is used to update a running estimate of the long-term overall covariance matrix $\hat{\Sigma}_{xx}[i]$ according to $$\hat{\Sigma}_{xx}[i] = \gamma \hat{\Sigma}_{xx}[i-1] + \frac{1-\gamma}{K} \hat{R}_{xx}[i]. \tag{21}$$

Finally, the interference covariance matrix is formed in step 6.8 by subtracting user 0's covariance matrix from the overall covariance matrix.

$$\hat{\Sigma}_{10}[i] = \hat{\Sigma}_{xx}[i] - \hat{\Sigma}_{0}[i]. \tag{22}$$

FIG. 7, which describes subset selection for the non-SDMA implementation, is very similar to FIG. 3 but without steps 3.8 and 3.9 since only one iteration is needed for user m=0.

The short-term loop for the non-SDMA case is like that illustrated in FIG. 4 for the SDMA implementation, but without steps 4 4, 4.9 and 4.10 (no iteration over m and with m=0 throughout).

For the non-SDMA embodiment, where the matrix switch is positioned at the RF level, and the number of RF front-ends is equal to the size of the subset, the effective training period must be made longer than in an otherwise similar SDMA embodiment.

Indeed the short-term covariance matrices $R_0$, $R_{xx}$ must be estimated in this case in a piecewise fashion by periodically changing the RF switch to a new subset in such a manner as to process in sequence all pairs of array elements. Hence, the training period must be made longer by a factor of $$\frac{\binom{N}{2}}{\binom{S}{2}}$$

either by lengthening the training prefix or utilizing several consecutive prefixes (in several consecutive packets) in constructing a single estimate.

Space-time Implementation

The implementations described so far were concerned with flat fading (narrowband) channels and therefore only spatial filtering was required. For frequency-selective fading (i.e., wideband) channels, temporal processing in the form of equalization must be included in the structure to maintain adequate performance. Thus, each branch of each of the MMSE processors (one per desired user sharing a carrier) will include a full equalizer instead of a single weight. If the subset size is 3, there would be 3 such equalizers per desired user. An equalizer will typically take the form of a tapped-delay line, where each tap is weighted and summed and taps are symbol-spaced. It follows that an MMSE processor with 3 branches must then adapt 3L taps, where the equalizer length L must be larger than the impulse response of the channel for adequate performance.

The process of subset selection must also be modified somewhat in a frequency-selective context. Since covariance matrices are in this case frequency-selective, the original theoretical subset selection criterion (see (10)) can easily be adapted to a wideband operation by integrating over the band (see 23) as follows;

$$S_{opt}^{(0)} = \max_{S_g} \frac{1}{f_{max} - f_{min}} \int_{f_{min}}^{f_{max}} tr\left[\sum_{0}^{(S_g)}(f)\sum_{I_0}^{(S_g)}(f)^{-1}\right] df, \text{ for } s = 1, \ldots, N_S \text{ where} \quad (23)$$

$$\sum_{0}^{(S_g)}(f) = \sum_{k=-\infty}^{\infty} \left\langle C_0^{(S_g)}\left(f - \frac{k}{T}\right) C_0^{(S_g)H}\left(F - \frac{k}{T}\right)\right\rangle, \quad (24)$$

$$\sum_{I_0}^{(S_g)}(f) = \sum_{k=-\infty}^{\infty} \sum_{m=1}^{M} \left\langle C_m^{(S_g)}\left(f - \frac{k}{T}\right) C_m^{(S_g)H}\left(F - \frac{k}{T}\right)\right\rangle, \quad (25)$$

It should be noted that, in the above, the summation over k reflects the spectral replication associated with symbol-spaced sampling of the signals, i.e., the covariance matrices have been derived with sampled versions of the channel impulse responses.

The criterion described by (23) can be converted to the time domain by virtue of the general form of Parseval's relation to yield $$S_{opt}^{(0)} = \max_{S_g} \sum_{t=-\infty}^{\infty} tr\left[\sum_{0}^{(S_g)}[i]\sum_{I_0}^{(S_g)}[i]^{-1}\right] \text{ for } s = 1, \ldots, N_g, \quad (26)$$

where $$\sum_{0}^{(S_g)}[i] = \mathfrak{I}^{-1}\left[\sum_{0}^{(S_g)}[f]\right] = \left\langle c_0^{(S_g)}[l]c_0^{(S_g)H}[l-i]\right\rangle, \quad (27)$$

$$\sum_{0}^{(S_g)}[i] = \mathfrak{I}^{-1}\left[\sum_{0}^{(S_g)}[f]\right] = \sum_{m=1}^{M}\left\langle c_m^{(S_g)}[l]c_m^{(S_g)H}[l-i]\right\rangle, \quad (28)$$

where $\mathfrak{I}^{-1}[\cdot]$ denotes the inverse Fourier transform.

In a practical implementation, the ideal covariance matrices would be replaced by estimates obtained typically via methods similar to those described in narrowband implementations. Likewise, the summation i in (26) would need to be truncated to the length L of the equalizers. Hence:

$$S_{opt}^{(0)} = \max_{S_g} \sum_{i=0}^{L-1} tr\left[\sum_{0}^{(S_g)}[i]\sum_{I_0}^{(S_g)}[i]^{-1}\right] \text{ for } s = 1, \ldots, N_s. \quad (29)$$

Figure 8:
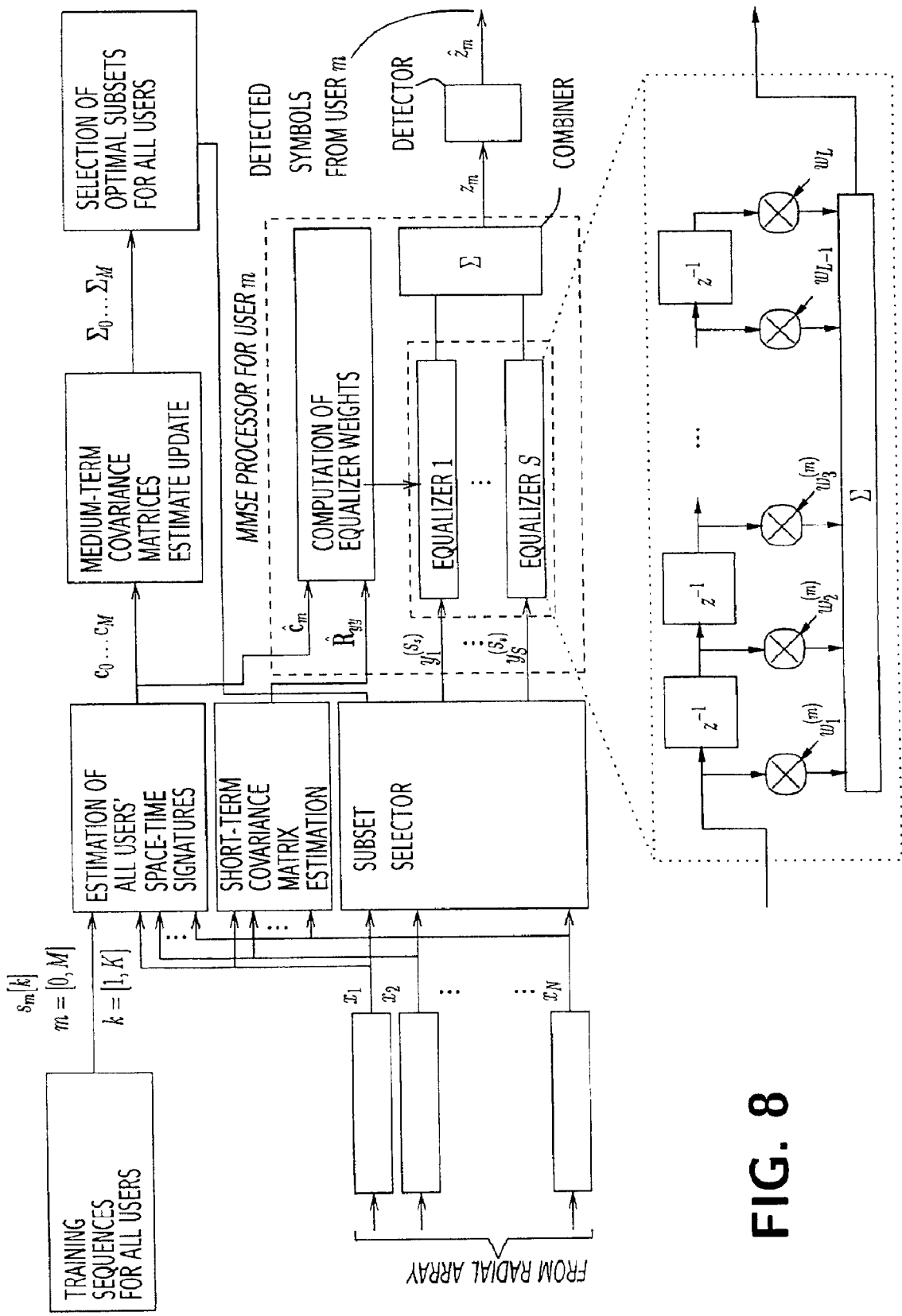
FIG. 8 is a simplified block schematic diagram of a space-time receiver embodying the invention.

FIG. 8 shows the general structure of a space-time receiver implementation with associated signal processing functions.

It should be appreciated that the present invention could be used to advantage in CDMA in certain situations, for example where some users constitute strong interferers. Indeed, it is well-known that one of the major problems limiting the number of users in CDMA is the presence of relatively strong interferers which cannot be eliminated by despreading. This is known as the "near-far effect" and it creates a situation analogous to SDMA since there are interferers "leaking into" or effectively coexisting on the virtual carrier corresponding to the desired user's code. The spatial discrimination power of an adaptive array combined with the present invention (with modifications appropriate to the CDMA context) provide a relatively inexpensive and effective solution.

The present invention is distinguished from known selection diversity array antenna systems which select the antenna element which gives the best performance for a particular desired user, since embodiments of the present invention select, on an ongoing basis, the subset of antenna elements which give the best global quality index for a particular desired user.

Preferred embodiments of the invention are predicated upon the fact that:

1. At a base station, most of the energy arriving from a given signal source is typically concentrated within a narrow angle or cone. Occasionally, there will also be one or more directions of arrival (DOAs) with significant power, but these are typically characterized by a much narrower angle spread than the main DOA. In this context, the use of a radial array of directive elements (or an array of omnidirectional elements and a preprocessing beamforming matrix which simulates said radial array through pattern synthesis) implies that a small subset of elements can be sufficient to capture most of the energy of any one user's signal. Using only a subset of the antenna element signals reduces the processing requirements.

2. The medium-term covariance matrix (averaged over the small-scale multipath fading, i.e. the short term variations in the channel characteristics (gains, delays and phases)) of a given user's signal measured at the array input varies relatively slowly and can generally be assumed fixed for periods of the order of a second.

The proposed invention, however, does not seek to identify all degrees of freedom of the desired users channel, but rather to select (exploiting the directivity of the array elements when a radial array is used) the S most significant elements in order to achieve the minimum mean-square error. Such a selection is not really based on identifying the degrees-of-freedom, or modes, of the desired users channel since interferers are also taken into account in the selection process. It is a procedure to intelligently reduce (by exploiting the geometry of the impinging waves) the number of array degrees-of-freedom that require active adaptation in order to achieve a proportional reduction in both numerical and hardware complexity.

Although ten, input ports and ten antenna elements are shown, that number is chosen only for purposes of illustration. In practice, there might be even more depending on practical considerations such as cost, physical array size, etc.). Likewise, although FIG. 1 shows a subset of 3, the most useful choices (depending on the desired complexity/performance tradeoff) are likely to be between 2 and 4 elements, inclusively. Furthermore, it should be noted that the relative complexity reduction introduced by this invention with respect to standard MMSE array processing is approximately proportional to N/S.

The receiver system illustrated in FIG. 5 has the advantage of necessitating only as many RF front-end units as the number of elements in a subset (3 in the specific example). Typically, an RF front-end is both bulky and relatively expensive and it is therefore advantageous to reduce the number of such units with respect to a fully adaptive array. However, the RF matrix switch 16 also can be an expensive component and may in some cases (depending on the carrier frequency and bandwidth) nullify the cost advantage stemming from the reduced number of RF front-ends. In the receiver system illustrated in FIG. 1, where all array elements are each equipped with a signal receiving unit (front-end) and the matrix switch is placed after A/D conversion, the said switch is then no longer an expensive RF component but rather a digital multiplexer capable of multiplexing 6 serial or parallel data streams onto 3. Alternatively, the multiplexer can be absorbed into the signal processing unit 14 provided the latter has sufficient input resources. Conversely, the subset selection logic could be separated.

While it is general practice to assume that the channels can be considered static over the length of a block (i.e., the length of a block is significantly smaller than the channel correlation time), the present invention is applicable equally well in other cases where continuous tracking (using adaptive algorithms such as the least-mean-square (LMS) or the recursive-least-squares (RLS) algorithm) is necessary, If in fact continuous tracking is implemented, it may not be necessary to provide frequent training sequences. Indeed, both subset selection and weight computation updates can be performed using past decisions as training symbols, provided the latter are reliable. Hence, training sequences, while less frequent, would still be required to: (1) initialize the system when a new link is formed so that its first decisions are reliable enough to start the tracking procedure; and (2) periodically reset the system to minimize errors due to lost tracking.

It should be appreciated that the invention is not limited to use in base stations of cellular telephone systems, but could also be used in mobile stations of such systems. Moreover, receivers according to the invention could be used in, for example, wireless local area networks, packet radio networks, and other wireless networks.

It should be noted that the invention embraces not only the array receiver systems described hereinbefore but also the receiver per se for use with an array of antenna elements and the signal processor for retrofitting to an exiting array antenna receiver system.

To recapitulate, the adaptation algorithm comprises two loops. The long-term loop in the narrowband case can be broken down as follows:

A. For every user m, m=0, . . . , M+1:

The short-term covariance matrix of user m's signature over all N antenna elements is estimated based on a known training sequence transmitted by user The short-term estimate is used to update a running estimate of the medium-term-averaged covariance matrix of user m's signature (6).

Using the medium-term averaged covariance matrices computed for all users, compute the covariance matrix of the interference seen by user m:

$$\sum_{I_m} = \sum_{i=0}^{M} \sum_{i \neq m}. \tag{30}$$

B. For all subsets $$\{S_s\}_{s=0}^{N_s}:$$

Select appropriate elements in $\Sigma_m$ and $\Sigma_{I_m}$ to form $\Sigma_m^{(S_s)}$ and $\Sigma_{I_m}^{(S_s)}$.

Compute subset selection criterion as per (4).

Compare with previously computed maximum value of criterion (compare with zero if first iteration).

If new value is larger save it and corresponding subset index.

Repeat loop B until all $N_s$ subsets have been processed.

Transfer selected subset index $S_m$ to subset selector for user m.

Repeat from A until all users have been processed.

Wait for next long-term training interval and repeat loop A.

The short-term loop proceeds as follows:

C. For every user m, m=0, . . . , M:

Estimate S×S short-term covariance matrix $R_{yy}^{(S_m)}$ across subset $S_m$. This may be done independently for each user according to (9) or the overall N×N short-term covariance matrix can be computed once and used to produce (by selecting the appropriate elements) the required S×S covariance matrices across all users' respective subsets.

Estimate user m's spatial signature $c_m^{(S_m)}$ across subset $S_m$ using (8).

Compute the weight vector $w=R_{yy}^{(S_m)-1}c_i^{(S_m)}$.

Transfer the weights to MMSE processor m.

Repeat from C for all users.

Wait for next short-term training interval (next packet from same user group) and repeat loop C.

INDUSTRIAL APPLICABILITY

It is known that antenna arrays with appropriate signal processing means, when employed in wireless networks, allow more links to coexist simultaneously in the same band /carrier and/or provide better link quality (in terms of voice quality in telephony, bit error rate in data links, or robustness against fading).

As wireless systems evolve, three factors emerge as being of paramount importance:

(i) the switch from analog to digital;

(ii) the increasing predominance of broadband channels (which often require ISI mitigation) to accommodate large data rates;

(iii) the capacity bottleneck from which many cellular systems suffer.

The implementation of a space-time receiver at the base station in combination with SDMA is without a doubt the most promising avenue for increasing capacity in broadband wireless systems. Indeed, an N-element array can theoretically bring an N-fold increase in capacity (i.e. number of simultaneously active users per carrier). However, the cost of developing and implementing such devices is significant since each additional antenna element requires an additional front-end receiver and additional computing power in order to adapt taps (weights) and perform other signal processing tasks.

Therefore the complexity (and hence the cost) of introducing a conventional array system into an existing wireless network can be prohibitive.

The widespread acceptance of antenna arrays and space-time processors in the marketplace is only a matter of time and recent industry interest confirms this. Reluctance in the past has probably been due to the relative complexity/cost of these solutions. Although advances in technology (which lead to lower device costs) and the urgency of the capacity problem may have overcome some hesitations, complexity is still a very real issue especially at high bandwidths and/or at high frequencies.

The present invention provides a less complex solution. In fact, it can provide a reduction in complexity of an order of magnitude with respect to a canonical linear space-time receiver with minimal performance degradation.

It should be noted that, when compared with other subset selection array systems, the present invention provides better performance by selecting subsets based on subset performance, not individual branches. Furthermore, the subset selection criterion takes into account interference and interference correlation across the array.

To limit the overhead of evaluating and selecting subsets, the present invention also proposes a method of subset selection based upon long term statistics (with respect to the fading rate), which can, in certain embodiments, reduce the complexity of the hardware and/or software involved in subset selection by an order of magnitude.

The proposed invention differs in its applicability; indeed, its purpose is to mitigate co-channel interference as well as provide robustness against fading while the two selection diversity schemes mentioned are generally studied for robustness against fading alone. Furthermore, the proposed invention exploits the geometry of arriving signals at the base station through the use of radially-arranged directional elements. The selection of subsets based on medium-term statistics is also a novel concept.

It should be noted that the benefits of this invention do not require SDMA or wideband (i.e. space-time) operation. This makes it an attractive path for incremental upgrade of existing systems.

What is claimed is:

1. An array receiver system, for receiving signals from a plurality of transmitting users, comprising an array of antenna elements (22/1, . . . , 22/10) and a receiver having a plurality of receiver sections ($12_0$, . . . , $12_7$), each corresponding to a different one of the users, the receiver sections each having a signal processing unit ($16_0$) for processing and combining a subset of signals from the antenna elements to produce a received signal for the corresponding user, the receiver further comprising switching means ($18_0$) for selecting a plurality of different subsets of signals from the antenna elements for processing for the signal processing unit ($16_0$), each subset consisting of a predetermined number of said signals, each signal processing means serving to control the switching means to change the signals comprising the subset of signals used by the corresponding receiver section in dependence upon a measure of the potential performance of that receiver section with different subsets of said plurality of signals, said measure being based upon the combined subset of signals.

2. An array antenna radio receiver system according to claim 1, wherein the switching means comprises a switch matrix in each receiver section, and the receiver comprises a plurality of radio frequency (RF) front-end sections each coupling a respective one of the antenna elements to each of said switching means and each of the signal processing means, each front-end section for converting the signal from the corresponding antenna element to a format suitable for processing by said processing means, and each of said switch matrices selects subsets of the converted signals for application to the associated one of the different receiver sections.

3. An array antenna receiver system according to claim 2, wherein the processing unit:

periodically selects samples of the signals from the antenna elements;

uses the signal samples to compute a covariance matrix for each of the users;

uses the covariance matrices of all users to compute, for the associated user; an interference covariance matrix characterizing the sum of the interfering signals of others of said users;

selects each possible subset of the covariance matrices and the interference covariance matrices having the same prescribed number as elements in the subset; for each selected subset of signals and associated covariance matrices, computes said performance criterion; and for its own user, selects the subset that gives the best performance criterion.

4. An array receiver system according to claim 3, wherein the signal processing unit computes, as said measure, SINR as the trace of the covariance matrix estimate for the particular user m and subset times the inverse of the interference covariance matrix estimate for the particular user and subset selection according to the expression $$C = \mathrm{tr}\left[\sum_m \left(\sum_{l_m} \frac{(\hat{S}_s)}{(\hat{S}_s)}\right)^{-1}\right].$$

5. A receiver system according to claim 3, wherein the signal processing unit is arranged to monitor channel parameters for a particular subset selection and, in dependence upon said parameters, update each covariance matrix, said update occurring more frequently than subset selection.

6. A receiver system according to claim 3, wherein the signals received by the antenna elements comprise packets having embedded training sequences and, at preset estimation intervals, each processing means selects one of the different subsets of signals, samples said packets, extracts the training sequence, and uses the training sequence to obtain said measure of performance for the particular subset selected.

7. An array antenna radio receiver system according to claim 1, wherein each receiver section comprises a plurality of radio frequency (RF) front-end units equal in number to the number of signals in each of said subsets coupled to the signal processing means, and the switching means comprises a switch matrix for coupling selected ones of the antenna elements to respective ones of the RF front-end sections of each receiver section, each RF front-end section for converting the subset of signals from the corresponding antenna elements to a format suitable for processing by said processing means.

8. An array antenna receiver system according to claim 1, wherein each signal processing means measures said potential performance of the corresponding receiver section with all different possible subsets of said plurality of signals.

9. An array antenna receiver system according to claim 1, wherein each signal processing unit measures said performance by monitoring statistics of the signals derived from the different subsets over a time period long enough to average out fast fading effects due to phase relationships of multipath components of the subset signals.

10. A receiver system according to claim 1, wherein each signal processing unit is arranged to use minimum mean squared error (MMSE) in adaptively weighting and combining each subset of signals, determine a second performance criterion of each subset over a shorter time period than the first-mentioned time period, and adjust weights used by the MMSE process in dependence upon such short time period measurement.

11. A receiver system according to claim 10, wherein each signal processing unit determines said second performance criterion on the basis of signals from the current subset of antenna elements.

12. A receiver system according to claim 1, wherein the antenna elements are arranged in a radial array of directive elements.

13. A receiver system according to claim 12, wherein the antenna elements are configured such that sectors corresponding to radiation/sensitivity lobes of the adjacent antenna elements partially overlap.

14. A receiver system according to claim 13, wherein the processor uses Minimum Mean Square Error (MMSE) processing in combining and processing the subset of signals, and the processing means uses the channel parameters to update weights used in said MMSE processing.

15. A method of receiving signals from a plurality of transmitting users using an array antenna having an array of antenna elements (22/1, . . . , 22/10) and a receiver having a plurality of receiver sections, each corresponding to a different one of the users, and coupled to the antenna elements by a switching means, the method comprising the steps of;
periodically selecting different subsets of signals from the antenna elements, processing and combining each subset of signals and determining potential performance of the receiver section of a particular user with that subset, determining which of the subsets would provide best performance, and controlling the switching means to change the signals comprising the subset of signals used by the corresponding receiver section.

16. A method according to claim 15, wherein the signals from the antenna elements are each converted to a form suitable for processing by the signal processing unit and the selection of the subset is made by selecting the converted signals.

17. A method according to claim 15, wherein the receiver comprises a single section having a plurality of RF front end units equal to the number of signals in the subset, and the selection of the subsets is made by selecting a subset of the signals from the antenna elements and applying the subset to the RF front end units.

18. A method according to claim 15, wherein the measure of said potential performance is made for all different possible subsets of said plurality of signals.

19. A method according to claim 15, wherein the performance is measured by monitoring statistics of the signals derived from the different subsets over a time period long enough to average out fast fading effects due to phase relationships of multipath components of the subset signals.

20. A method according to claim 19, comprising the steps of:
periodically selecting samples of said subset of the signals from the antenna elements,
using the signal samples to compute a covariance matrix for each of the users,
using the covariance matrices of all users to compute, for the associated user, an interference covariance matrix characterizing the sum of the interfering signals of others of said users
selecting each possible subset of the covariance matrices and the interference covariance matrices having the same prescribed number as elements in the subset,
for each selected subset of matrices, computing said performance criterion; and
for the particular user, selecting the subset that gives the best performance criterion.

21. A method according to claim 20, wherein said measure is SINR computed as the trace of the covariance matrix estimate for the particular user and subset times the inverse of the interference covariance matrix estimate for the particular user and subset selection according to the expression $$C = \mathrm{tr}\left[\sum_m \left(\sum_{l_m} \frac{(\hat{S}_s)}{(\hat{S}_s)}\right)^{-1}\right]. \qquad (24)$$

22. A method according to claim 20, wherein channel parameters are monitored for a particular subset selection and, in dependence upon said parameters, each covariance matrix updated more frequently than subset selection.

23. A method according to claim 20, wherein the signals received by the antenna elements comprise packets having embedded training sequences and, at preset estimation intervals, one of the different subsets of signals is selected, said packets sampled, the training sequence extracted, and the training sequence used to obtain said measure of performance for the particular subset selected.

24. A method according to claim 15, wherein the subset of signals are processed using minimum mean squared error (MMSE) to adaptively weight and combine each subset of signals, and a second performance criterion of each subset is measured over a shorter time period than the first-mentioned time period, and weights used by the MMSE process adjusted in dependence upon such short time period measurement.

25. A method according to claim 24, wherein said second performance criterion is determined on the basis of signals from the currently-selected subset of antenna elements.

26. A method according to claim 24, wherein the MMSE uses the channel parameters to update the weights.

27. A receiver for use with an array antenna having a plurality of antenna elements to receive signals from a plurality of transmitting users, the receiver having a plurality of receiver sections ($12_0, \ldots, 12_7$), each corresponding to a different one of the users, the receiver sections each having a signal processing unit ($16_0$) for processing and combining a subset of signals from the antenna elements to produce a received signal for the corresponding user, the receiver further comprising switching means ($18_0$) for selecting a plurality of different subsets of signals from the antenna elements for processing for the signal processing unit ($16_0$), each subset consisting of a predetermined number of said signals, each signal processing means serving to control the switching means to change the signals comprising the subset of signals used by the corresponding receiver section in dependence upon a measure of the potential performance of that receiver section with different subsets of said plurality of signals, said measure being based upon the combined subset of signals.

* * * * *